US012696291B2

(12) United States Patent　　　(10) Patent No.:　US 12,696,291 B2
Cozzo et al.　　　　　　　　　　　(45) Date of Patent:　　　Jul. 28, 2026

(54) METHOD AND APPARATUS TO SUPPORT REPETITIONS OF A PUCCH TRANSMISSION WITH HARQ-ACK INFORMATION

(71) Applicant: Samsung Electronics Co., Ltd., Suwon-si (KR)

(72) Inventors: Carmela Cozzo, San Diego, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 18/466,650

(22) Filed: Sep. 13, 2023

(65) Prior Publication Data

US 2024/0114522 A1　　　Apr. 4, 2024

Related U.S. Application Data

(60) Provisional application No. 63/472,728, filed on Jun. 13, 2023, provisional application No. 63/467,798, (Continued)

(51) Int. Cl.
*H04W 72/232*　　　(2023.01)
*H04B 17/318*　　　(2015.01)
*H04W 72/21*　　　(2023.01)

(52) U.S. Cl.
CPC ........ *H04W 72/232* (2023.01); *H04B 17/328* (2023.05); *H04W 72/21* (2023.01)

(58) Field of Classification Search
CPC .. H04W 72/232; H04W 72/21; H04B 17/328; H04L 1/1896
See application file for complete search history.

(56) References Cited

U.S. PATENT DOCUMENTS

| | | | |
|---|---|---|---|
| 2017/0195464 A1* | 7/2017 | Lee ...................... | H04L 69/324 |
| 2021/0100004 A1 | 4/2021 | Yang et al. | |

(Continued)

FOREIGN PATENT DOCUMENTS

| | | | | |
|---|---|---|---|---|
| WO | WO-2021062209 A1 * | 4/2021 | .......... | H04L 5/0094 |
| WO | 2022076134 A1 | 4/2022 | | |

(Continued)

OTHER PUBLICATIONS

International Search Report and Written Opinion issued Dec. 27, 2023 regarding International Application No. PCT/KR2023/014662, 6 pages.
"5G; NR; Physical channels and modulation (3GPP TS 38.211 version 17.3.0 Release 17)", ETSI TS 138 211 V17.3.0, Sep. 2022, 141 pages.

(Continued)

*Primary Examiner* — Charles C Jiang
*Assistant Examiner* — Ryan C Kavleski

(57)　　　　ABSTRACT

Methods and apparatuses for physical uplink control channel (PUCCH) transmission with hybrid automatic repeat request-acknowledgement (HARQ-ACK) information in a wireless communication system. A method performed by a user equipment (UE) includes receiving information for a first set of PUCCH resources for a transmission of a PUCCH on a primary cell and a set of numbers for repetitions of the transmission of the PUCCH and receiving a physical downlink control channel (PDCCH) providing a downlink control information (DCI) format that includes a downlink assignment index (DAI) field and a PUCCH resource indicator field. The method further includes determining a PUCCH resource from the first set of PUCCH resources based on the PUCCH resource indicator field; determining the number of repetitions, from the set of numbers of repetitions, based on the DAI field; and transmitting the PUCCH with the number of repetitions using the PUCCH resource on the primary cell.

14 Claims, 13 Drawing Sheets

Related U.S. Application Data filed on May 19, 2023, provisional application No. 63/432,921, filed on Dec. 15, 2022, provisional application No. 63/410,920, filed on Sep. 28, 2022.

(56) References Cited

U.S. PATENT DOCUMENTS

| | | | |
|---|---|---|---|
| 2021/0152292 A1* | 5/2021 | Fu | H04W 52/48 |
| 2022/0278807 A1 | 9/2022 | Zhang et al. | |
| 2022/0287103 A1* | 9/2022 | Cozzo | H04W 74/0833 |
| 2024/0147539 A1* | 5/2024 | Kim | H04L 5/00 |

FOREIGN PATENT DOCUMENTS

| | | | |
|---|---|---|---|
| WO | 2022181597 A1 | 9/2022 | |
| WO | WO-2024071777 A1 * | 4/2024 | H04L 5/0055 |

OTHER PUBLICATIONS

"5G; NR; Multiplexing and channel coding (3GPP TS 38.212 version 17.3.0 Release 17)", Etsi TS 138 212 V17.3.0, Sep. 2022, 206 pages.

"5G; NR; Physical layer procedures for control (3GPP TS 38.213 version 17.3.0 Release 17)", ETSI TS 138 213 V17.3.0, Sep. 2022, 262 pages.

"5G; NR; Physical layer procedures for data (3GPP TS 38.214 version 17.3.0 Release 17)", ETSI TS 138 214 V17.3.0, Sep. 2022, 237 pages.

"3rd Generation Partnership Project; Technical Specification Group Radio Access Network; NR; Medium Access Control (MAC) protocol specification (Release 17)", 3GPP TS 38.321 V17.2.0, Sep. 2022, 246 pages.

"3rd Generation Partnership Project; Technical Specification Group Radio Access Network; NR; Radio Resource Control (RRC) protocol specification (Release 17)", 3GPP TS 38.331 V17.2.0, Sep. 2022, 1298 pages.

* cited by examiner

600

610 — UE receives a DCI format and determines a PUCCH resource for a PUCCH with HARQ-ACK information 620 — UE is indicated PUCCH is with repetitions?

No → 640 — UE transmits the PUCCH without repetitions in the resource

Yes → 630 — UE determines a number of repetitions and transmits the PUCCH with the number of repetitions in the resource

700

710 UE transmits a PRACH

720 UE receives a DCI format scheduling a PDSCH and determines a PUCCH resource for a PUCCH with associated HARQ-ACK

730 UE determines a number of repetitions for the PUCCH transmission based on a mapping between PRACH repetitions and PUCCH repetitions

740 UE transmits the PUCCH with the number of repetitions in the determined PUCCH resource

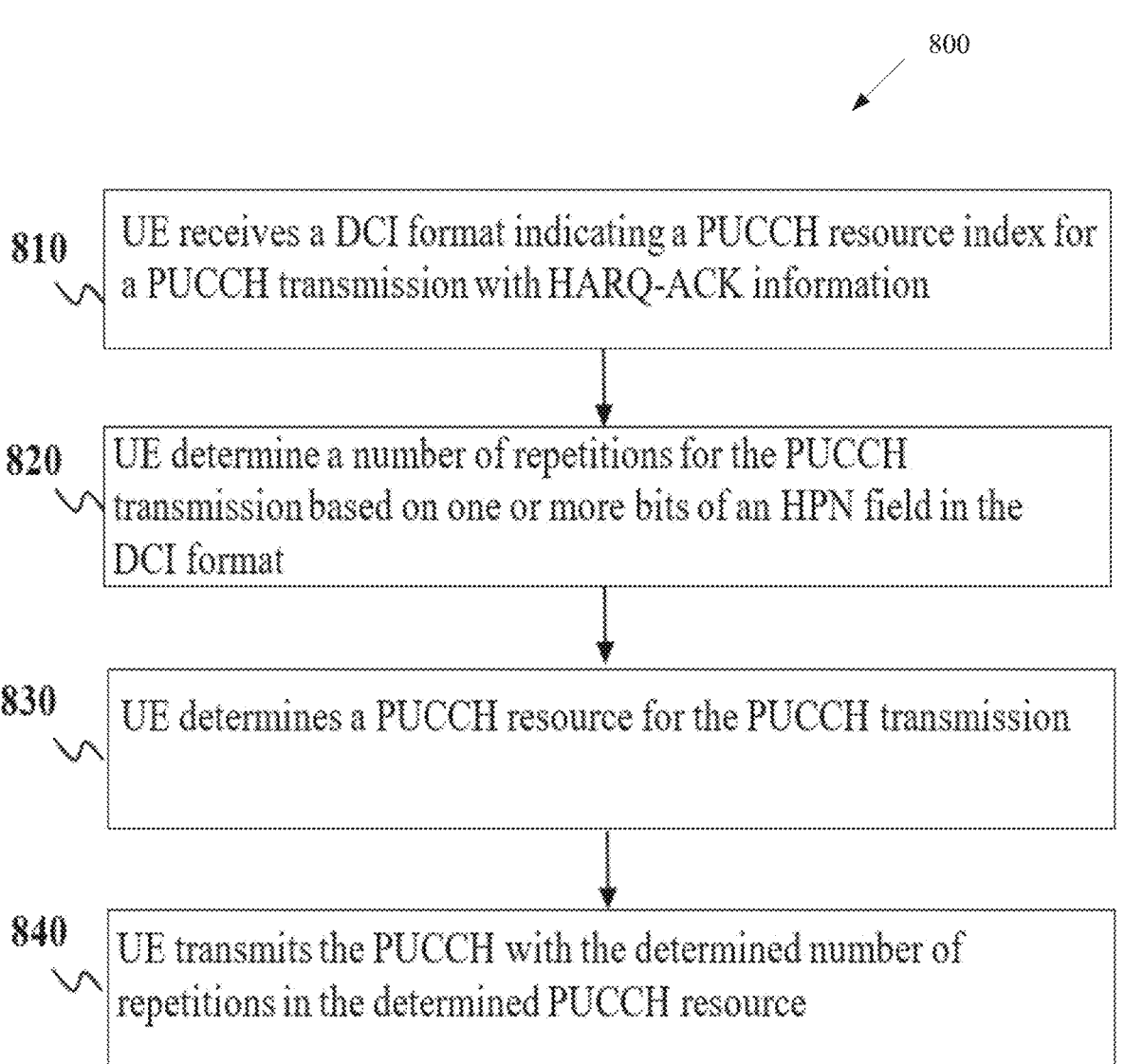

810 UE receives a DCI format indicating a PUCCH resource index for a PUCCH transmission with HARQ-ACK information 820 UE determine a number of repetitions for the PUCCH transmission based on one or more bits of an HPN field in the DCI format 830 UE determines a PUCCH resource for the PUCCH transmission 840 UE transmits the PUCCH with the determined number of repetitions in the determined PUCCH resource

FIG. 8

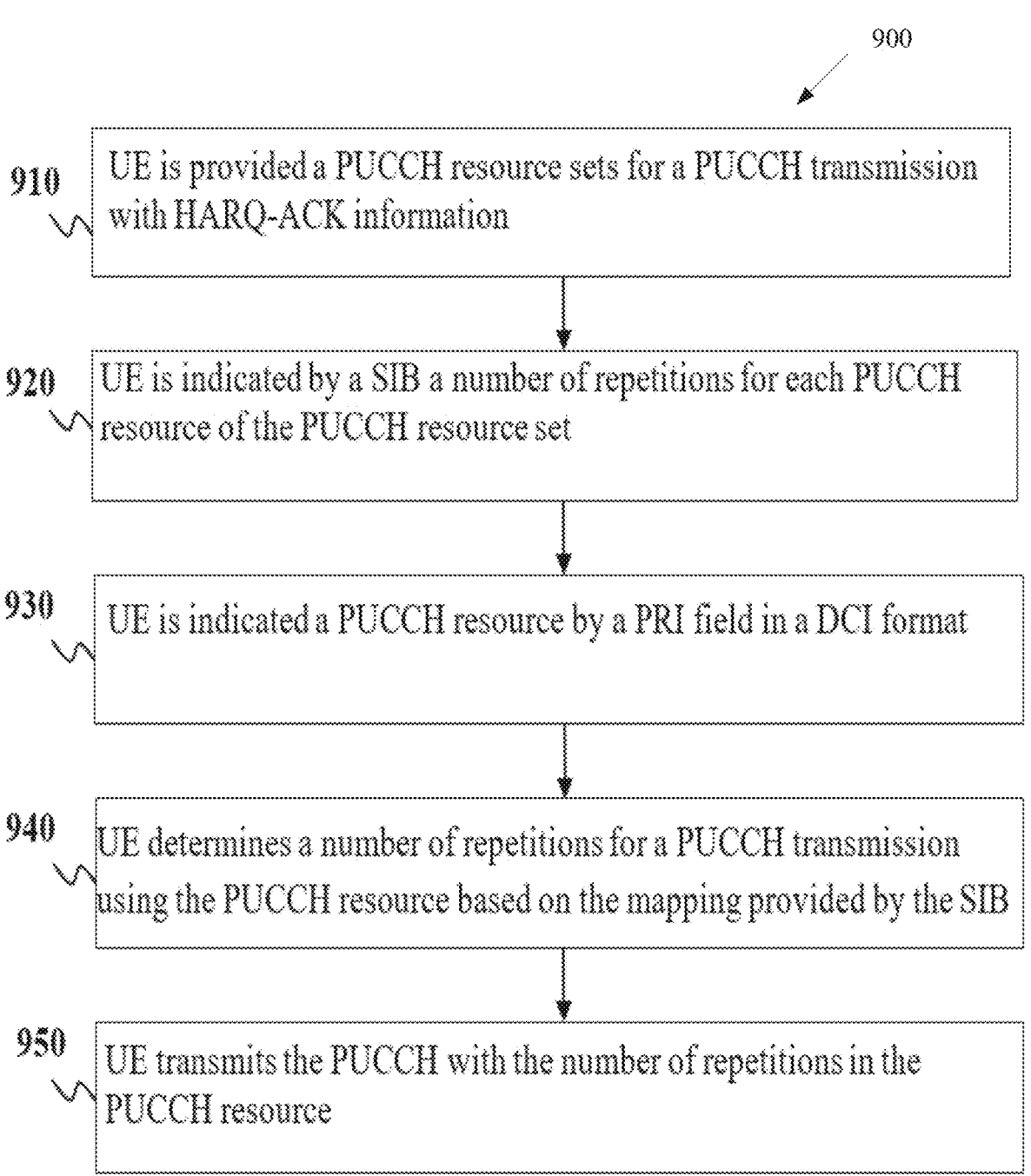

900

910 — UE is provided a PUCCH resource sets for a PUCCH transmission with HARQ-ACK information 920 — UE is indicated by a SIB a number of repetitions for each PUCCH resource of the PUCCH resource set 930 — UE is indicated a PUCCH resource by a PRI field in a DCI format 940 — UE determines a number of repetitions for a PUCCH transmission using the PUCCH resource based on the mapping provided by the SIB 950 — UE transmits the PUCCH with the number of repetitions in the PUCCH resource

FIG. 9

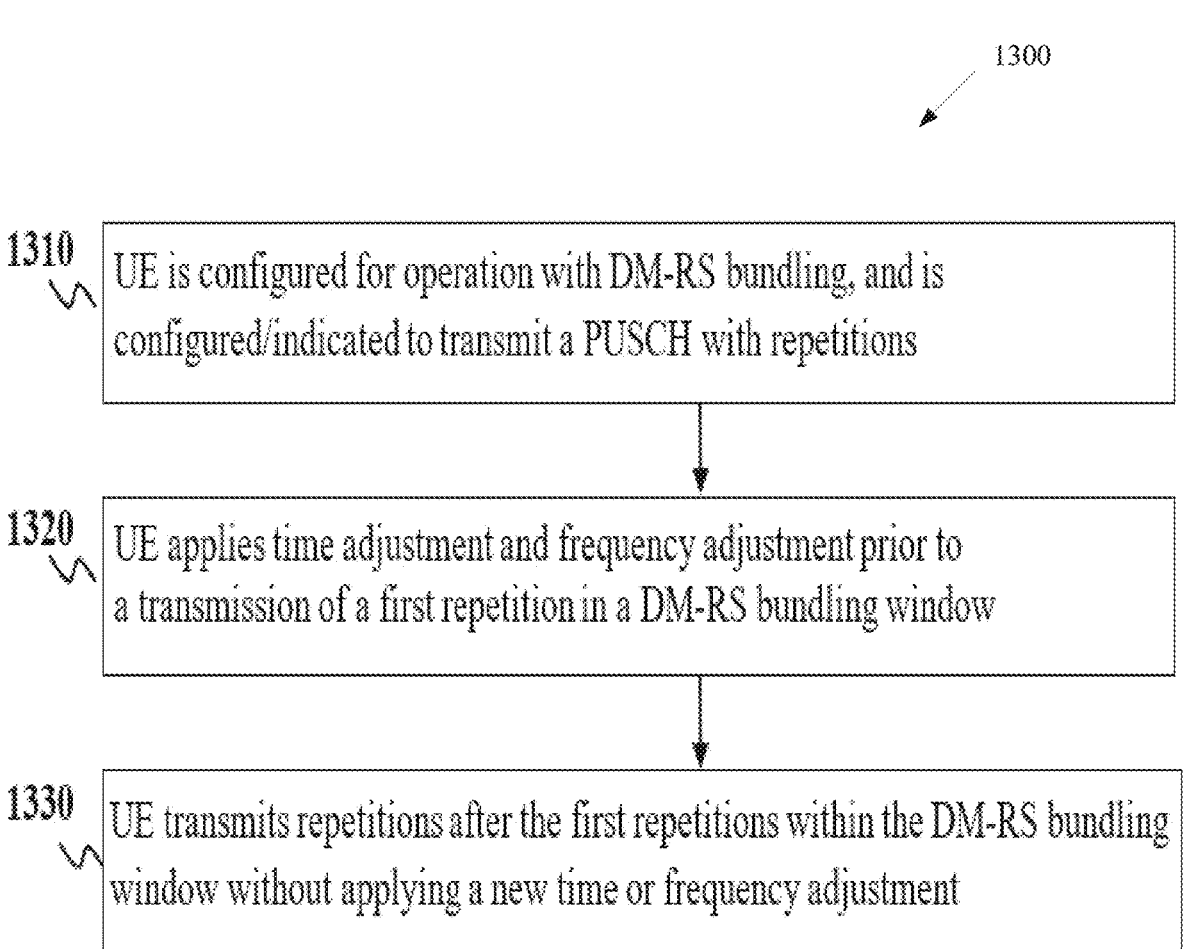

1300

1310  UE is configured for operation with DM-RS bundling, and is configured/indicated to transmit a PUSCH with repetitions 1320  UE applies time adjustment and frequency adjustment prior to a transmission of a first repetition in a DM-RS bundling window 1330  UE transmits repetitions after the first repetitions within the DM-RS bundling window without applying a new time or frequency adjustment

FIG. 13

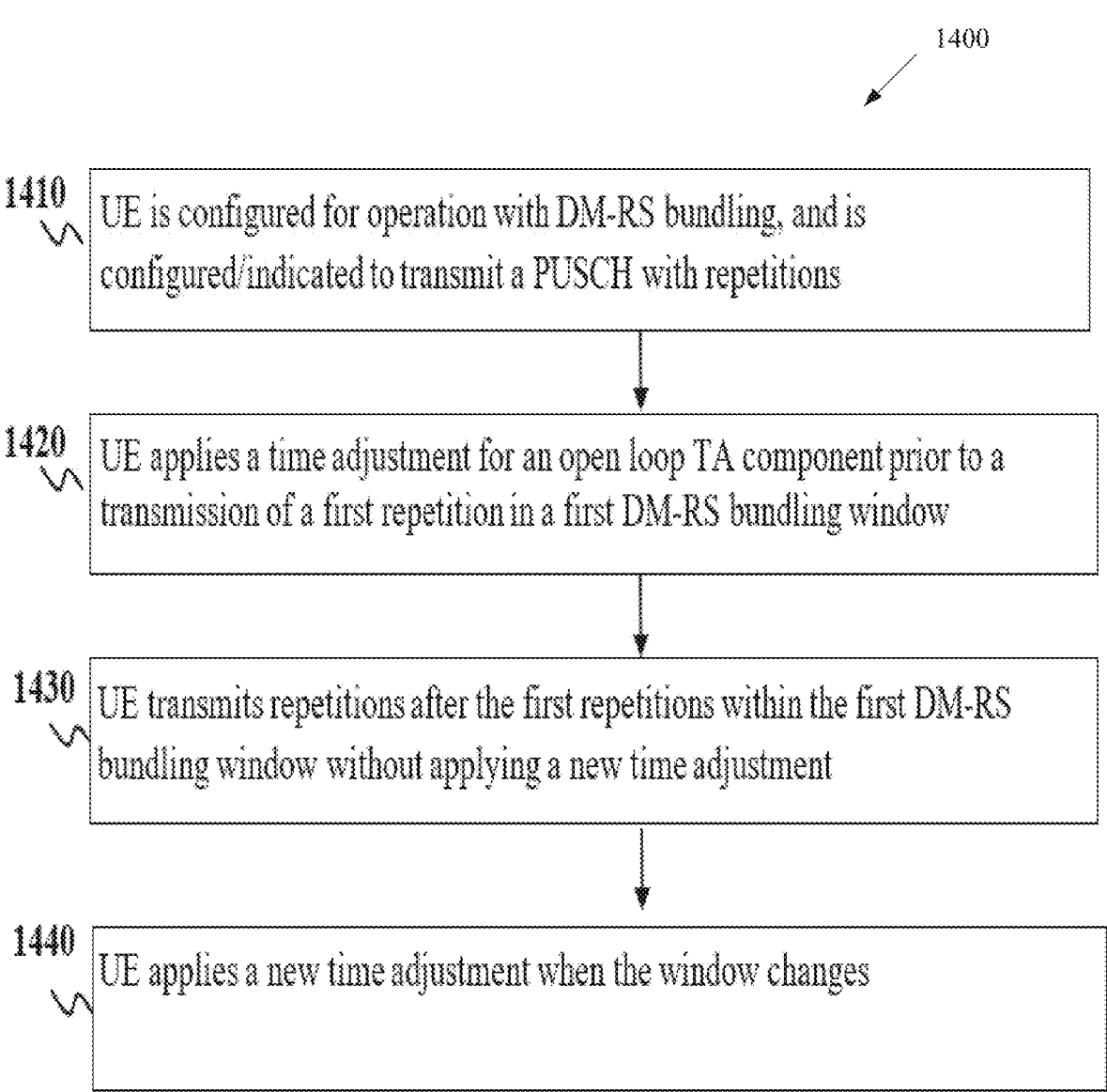

1400

1410  UE is configured for operation with DM-RS bundling, and is configured/indicated to transmit a PUSCH with repetitions 1420  UE applies a time adjustment for an open loop TA component prior to a transmission of a first repetition in a first DM-RS bundling window 1430  UE transmits repetitions after the first repetitions within the first DM-RS bundling window without applying a new time adjustment 1440  UE applies a new time adjustment when the window changes

FIG. 14

METHOD AND APPARATUS TO SUPPORT REPETITIONS OF A PUCCH TRANSMISSION WITH HARQ-ACK INFORMATION

CROSS-REFERENCE TO RELATED APPLICATIONS AND CLAIM OF PRIORITY

The present application claims priority to: U.S. Provisional Patent Application No. 63/410,920, filed on Sep. 28, 2022; U.S. Provisional Patent Application No. 63/432,921, filed on Dec. 15, 2022; U.S. Provisional Patent Application No. 63/467,798, filed on May 19, 2023; and U.S. Provisional Patent Application No. 63/472,728, filed on Jun. 13, 2023. The contents of the above-identified patent documents are incorporated herein by reference.

TECHNICAL FIELD

The present disclosure relates generally to wireless communication systems and, more specifically, the present disclosure relates to repetitions of a physical uplink control channel (PUCCH) transmission with hybrid automatic repeat request-acknowledgement (HARQ-ACK) information in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to repetitions of a PUCCH transmission with HARQ-ACK information in a wireless communication system.

In one embodiment, a user equipment (UE) is provided. The UE includes a transceiver configured to receive a system information block (SIB) providing information for a first set of physical uplink control channel (PUCCH) resources for a transmission of a PUCCH on a primary cell and a set of numbers for repetitions of the transmission of the PUCCH on the primary cell and receive a physical downlink control channel (PDCCH) providing a downlink control information (DCI) format that schedules a reception of a first physical downlink shared channel (PDSCH). The DCI format includes a downlink assignment index (DAI) field. The DCI format includes a PUCCH resource indicator field. First acknowledgement information corresponding to the reception of the first PDSCH is provided by the PUCCH. A value of the DAI field indicates a number of receptions of PDSCHs with corresponding acknowledgement information provided by the PUCCH when the UE is provided a second set of PUCCH resources by UE-specific higher layer signaling. The value of the DAI field indicates a number of repetitions, from the set of numbers for repetitions, for the transmission of the PUCCH when the UE is not provided the second set of PUCCH resources by UE-specific higher layer signaling. The UE further includes a processor operably coupled to the transceiver, the processor configured to determine a PUCCH resource from the first set of PUCCH resources based on the PUCCH resource indicator field and the number of repetitions, from the set of numbers of repetitions, based on the DAI field. The UE is not provided the second set of PUCCH resources by UE-specific higher layer signaling. The transceiver is further configured to transmit the PUCCH with the number of repetitions using the PUCCH resource on the primary cell.

In another embodiment, a base station (BS) is provided. The BS includes a transceiver configured to transmit a SIB providing information for a first set of PUCCH resources for a reception of a PUCCH on a primary cell and a set of numbers for repetitions of the reception of the PUCCH on the primary cell and transmit a PDCCH providing a DCI format that schedules a transmission of a first PDSCH. The DCI format includes a DAI field. The DCI format includes a PUCCH resource indicator field. First acknowledgement information corresponding to the transmission of the first PDSCH is provided by the PUCCH. A value of the DAI field indicates a number of transmissions of PDSCHs with corresponding acknowledgement information provided by the PUCCH when a UE is provided a second set of PUCCH resources by UE-specific higher layer signaling. The value of the DAI field indicates a number of repetitions, from the set of numbers of repetitions, for the reception of the PUCCH when the UE is not provided the second set of PUCCH resources by UE-specific higher layer signaling. The BS further includes a processor operably coupled to the transceiver. The processor is configured to determine a PUCCH resource from the first set of PUCCH resources based on the PUCCH resource indicator field and the number of repetitions, from the set of numbers of repetitions, based on the DAI field. The UE is not provided the second set of PUCCH resources by UE-specific higher layer signaling. The transceiver is further configured to receive the PUCCH with the number of repetitions using the PUCCH resource on the primary cell.

In yet another embodiment, a method performed by a user equipment is provided. The method includes receiving a SIB providing information for a first set of PUCCH resources for a transmission of a PUCCH on a primary cell and a set of numbers for repetitions of the transmission of the PUCCH on the primary cell and receiving a PDCCH providing a DCI format that schedules a reception of a first PDSCH. The DCI format includes a DAI field. The DCI format includes a PUCCH resource indicator field. First acknowledgement information corresponding to the reception of the first PDSCH is provided by the PUCCH. A value of the DAI field indicates a number of receptions of PDSCHs with corresponding acknowledgement information provided by the PUCCH when the UE is provided a second set of PUCCH resources by UE-specific higher layer signaling. The value of the DAI field indicates a number of repetitions, from the set of numbers for repetitions, for the transmission of the PUCCH when the UE is not provided the second set of PUCCH resources by UE-specific higher layer signaling. The method further includes determining a PUCCH resource from the first set of PUCCH resources based on the PUCCH resource indicator field; determining the number of repetitions, from the set of numbers of repetitions, based on the DAI field, wherein the UE is not provided the second set of PUCCH resources by UE-specific higher layer signaling;

and transmitting the PUCCH with the number of repetitions using the PUCCH resource on the primary cell.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a flowchart of UE procedure to transmit a PUCCH with a number of repetitions indicated by bits of a HARQ process number field in a DCI format according to embodiments of the present disclosure;

FIG. 9 illustrates a flowchart of UE procedure to transmit a PUCCH with a number of repetitions associated to a PUCCH resource based on a mapping provided by a SIB according to embodiments of the present disclosure;

FIGS. 13 and 14 illustrate flowcharts of UE procedure for DM-RS bundling according to embodiments of the present disclosure.

DETAILED DESCRIPTION

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
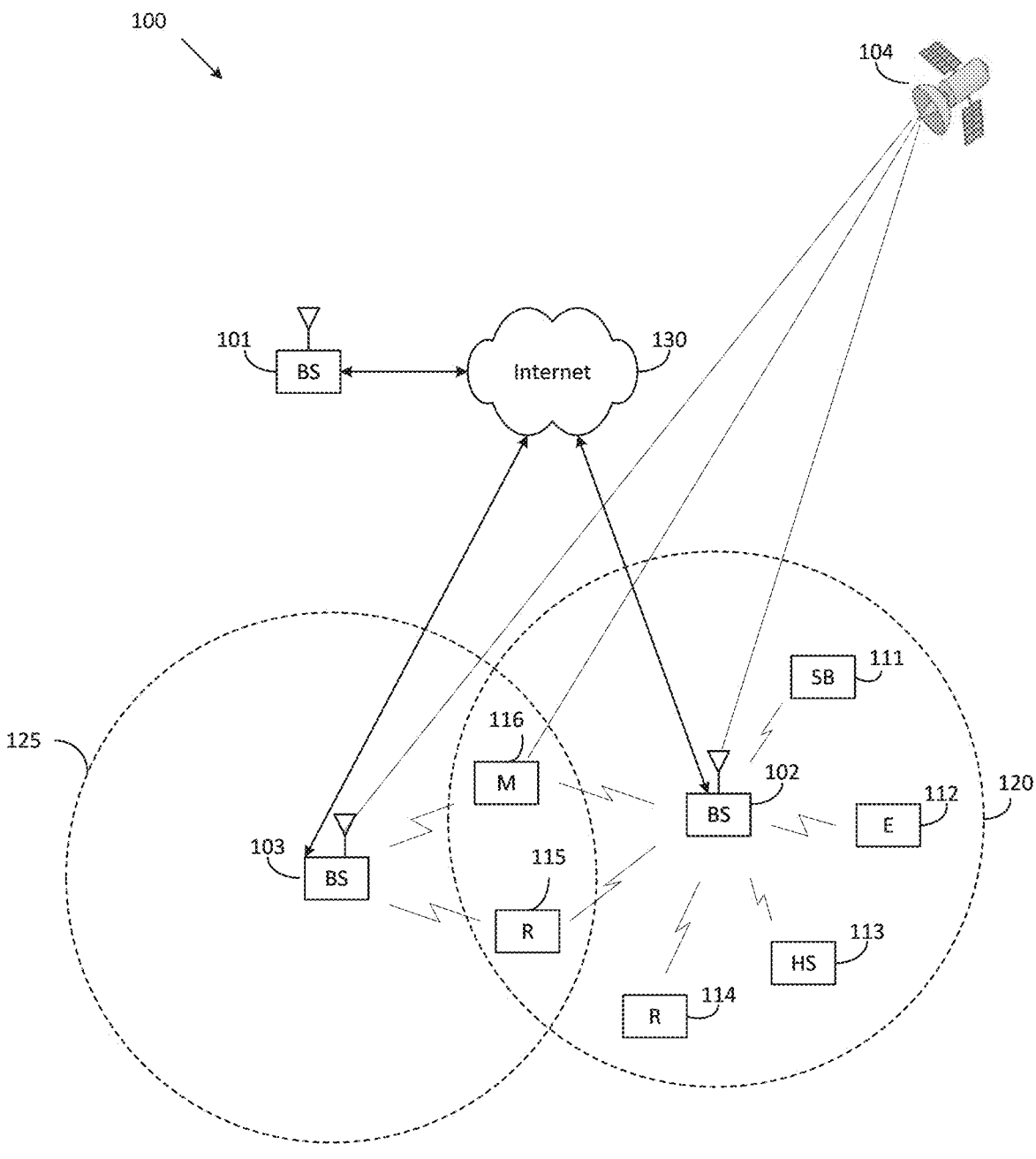
FIG. 1 illustrates an example of wireless network according to embodiments of the present disclosure.
Figure 2:
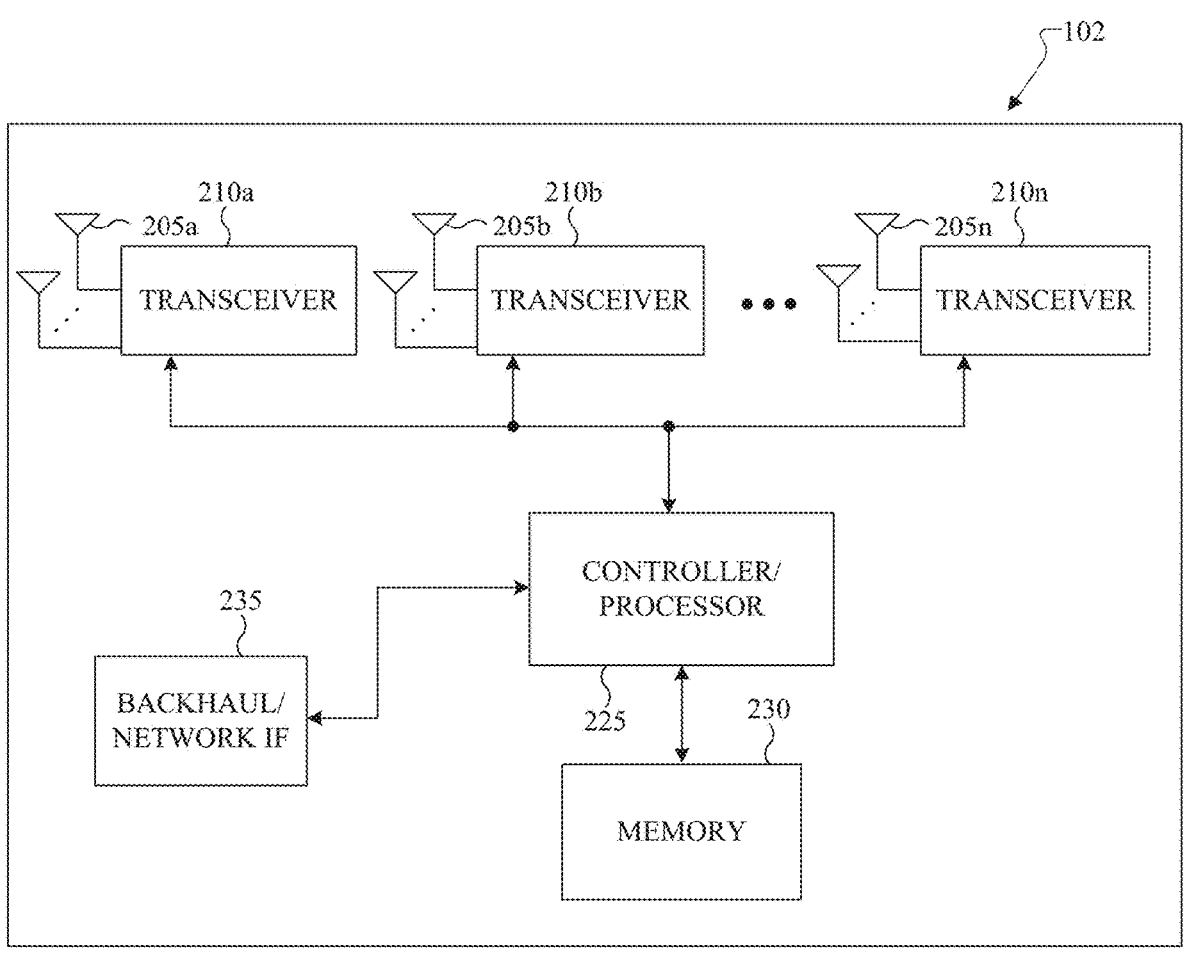
FIG. 2 illustrates an example of gNB according to embodiments of the present disclosure.
Figure 3:
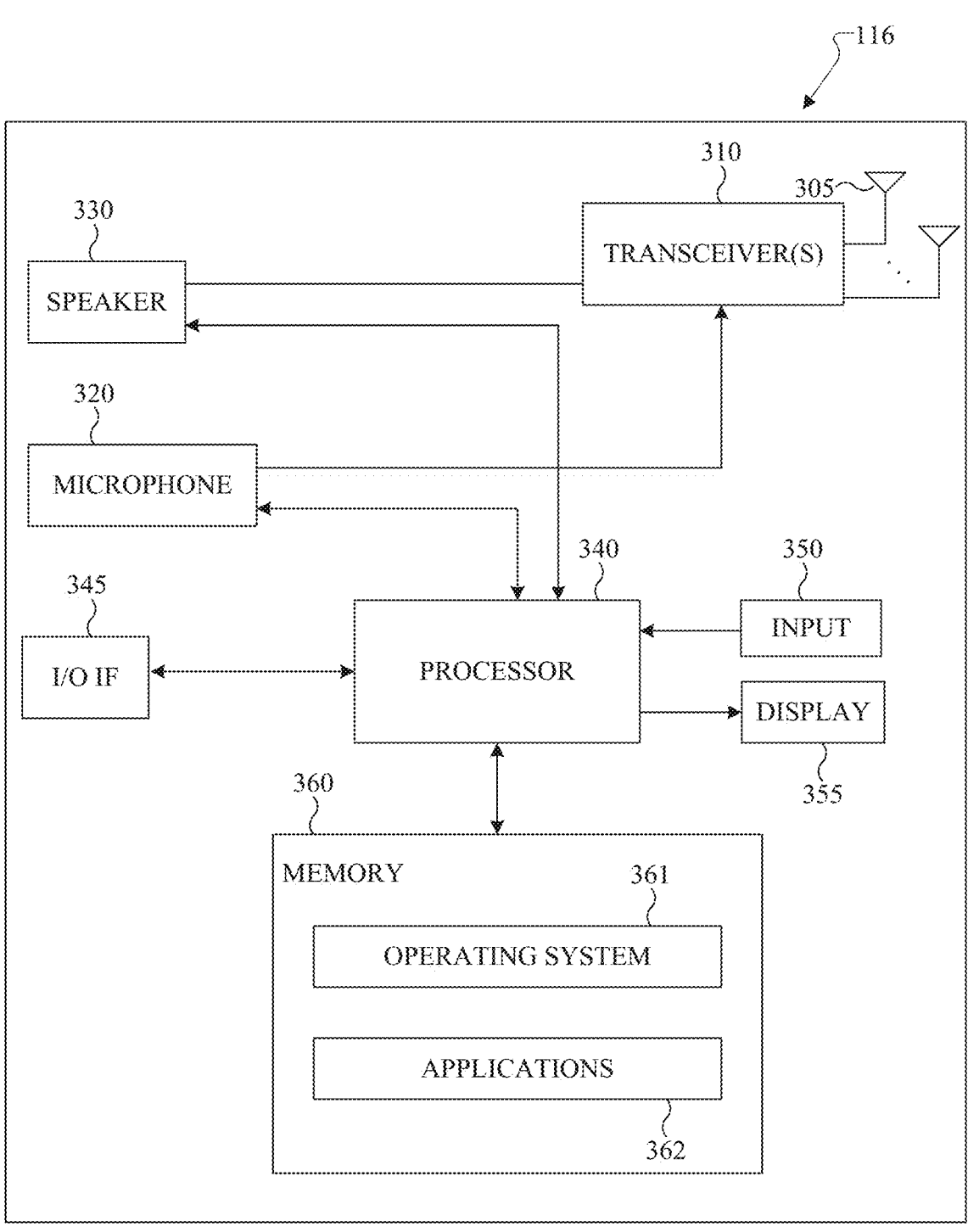
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for repetitions of a PUCCH transmission with HARQ-ACK information in a wireless communication system. In certain embodiments, and one or more of the gNBs 101-103 includes circuitry, programing, or a combination thereof, to support repetitions of a PUCCH transmission with HARQ-ACK information in a wireless communication system.

As described in more detail below, one or more of the UEs 111-116 include circuitry, programing, or a combination thereof for receiving system information including: information corresponding to location coordinates for a NTN gateway; information corresponding to a processing delay between the UE and a BS; and information corresponding to a reference point location; determining a timing advance based on a timing difference between the reference point location and the BS; and transmitting a timing advance report based on the determined timing advance. One or more of the gNBs 101-103 includes circuitry, programing, or a combination thereof, for generating system information including: information corresponding to location coordinates for a NTN gateway; information corresponding to a processing delay between a UE and a base station; and information corresponding to a reference point location; transmitting the system information; and receiving a timing advance report based on a timing advance, wherein the timing advance is based on a timing difference.

As described in more detail below, one or more of the UEs 111-116 include circuitry, programing, or a combination thereof, for an efficient neighbor cell search in a wireless communication network. In certain embodiments, and one or more of the gNBs 101-103 includes circuitry, programing, or a combination thereof, for an efficient neighbor cell search in a wireless communication network. Further, the network 100 could be an NTN in which one or more of the gNBs 101-103 are replaced by or receive network access via a non-terrestrial node such as a satellite.

Although FIG. 1 illustrates one example of a wireless network, various changes may be made to FIG. 1. For example, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes to support repetitions of a PUCCH transmission with HARQ-ACK information in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for repetitions of a PUCCH transmission with HARQ-ACK information in a wireless communication system.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355*m* which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
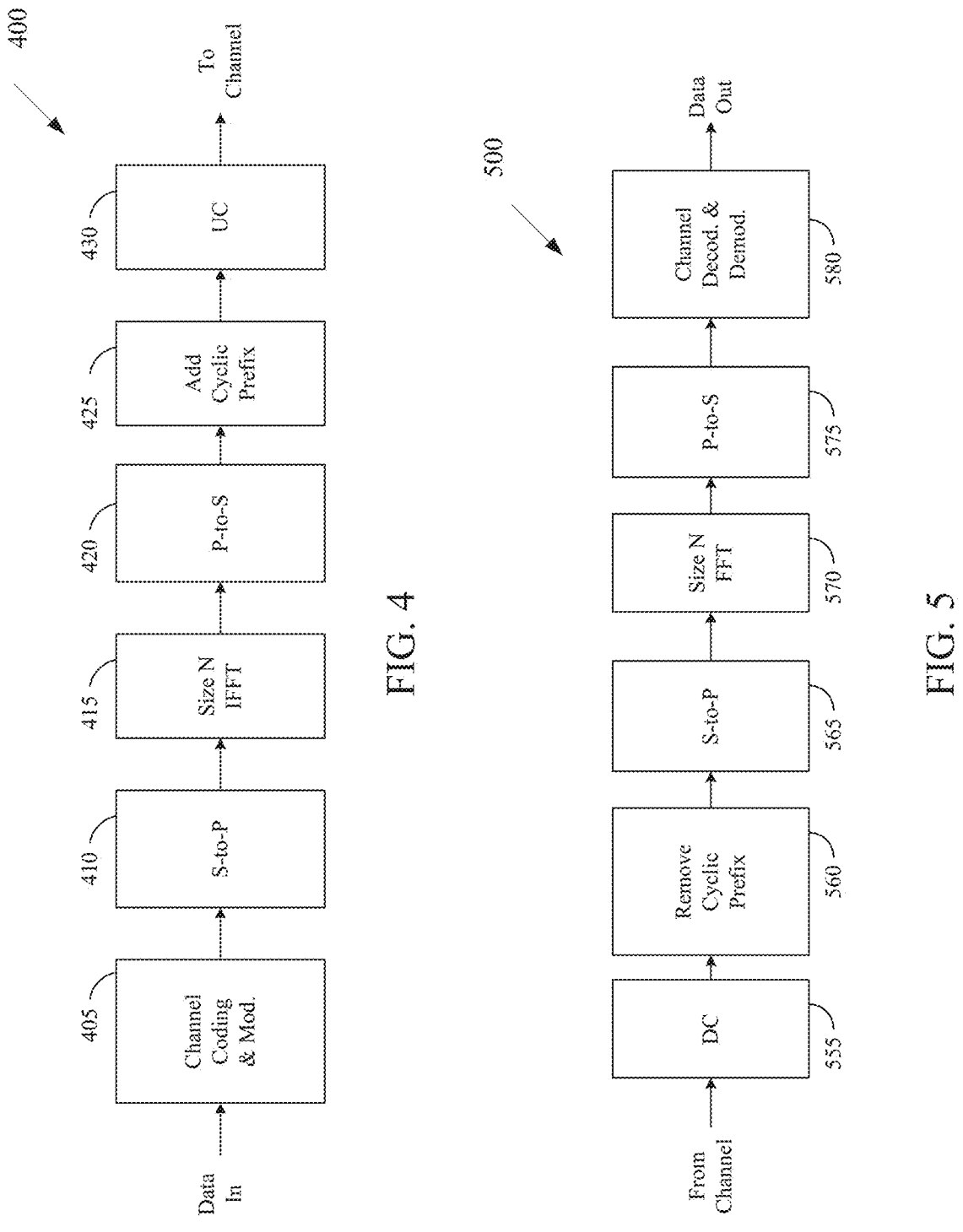
FIGS. 4 and 5 illustrate example of wireless transmit and receive paths according to embodiments of the present disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support repetitions of a PUCCH transmission with HARQ-ACK information in a wireless communication system. In some embodiments, the receive path 500 is configured to support SIB based cell changes in NTN as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 downconverts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In order to improve a reception reliability of a PUCCH transmitted by a UE, the UE can transmit the PUCCH with repetitions. The PUCCH can provide HARQ-ACK information in response to a PDSCH reception scheduled by a DCI format 1_0 with CRC scrambled by a TC-RNTI for a Type-1 RA procedure, or can provide HARQ-ACK information having ACK value if the RAR message(s) is for success RAR for a Type-2 RA procedure or, in general, HARQ-ACK information before receiving information by UE-specific RRC signaling for PUCCH resources.

A number of repetitions for a PUCCH transmission with HARQ-ACK information can be provided in a system information block (SIB) or, when the PUCCH transmission provides HARQ-ACK information associated with a DCI format, can be also indicated by the DCI format. The indication can be based on a separate field in the DCI format that indicates a number of repetitions for the PUCCH transmission, or can be included in the configuration of PUCCH resources and a PUCCH resource can be indicated by the DCI format. In addition to parameters such as a PUCCH format, a starting symbol and a number of symbols, or a starting RB and a number of RB s, a PUCCH resource can also include a number of repetitions for a PUCCH transmission using the PUCCH resource.

A UE may need to transmit a PUCCH with HARQ-ACK information using resources that are indicated by a SIB, such as when the PUCCH transmission is prior to the UE establishing a dedicated RRC connection with a serving gNB, or after the UE has a dedicated RRC connection with the gNB and the gNB does not provide PUCCH resource sets to the UE by UE-specific RRC signaling.

Therefore, there is a need to enable a UE to transmit a PUCCH with repetitions when the UE is not provided PUCCH resources by UE-specific RRC signalling.

There is another need to indicate to a UE a number of repetitions for a PUCCH transmission when the UE is not provided PUCCH resources by UE-specific RRC signalling.

Finally, there is another need for a gNB to identify whether a UE is capable of transmitting a PUCCH with repetitions before the UE establishes an RRC connection with the gNB.

In the present disclosure, various embodiments of the disclosure may be implemented for a UE that transmits a PUCCH with repetitions with one repetition per slot or with multiple repetitions within a slot.

In one embodiment, an indication of a number of repetitions for a PUCCH transmission with HARQ-ACK information from a UE is provided when the UE is not provided PUCCH resource sets by UE-specific RRC signaling.

In one embodiment, an indication of a number of repetitions for a PUCCH transmission with HARQ-ACK information by a DCI format is provided.

In one embodiment, an indication of a number of repetitions for a PUCCH transmission with HARQ-ACK information by an association with a PUCCH resource index is provided.

In one embodiment, an identification of a UE capable of transmitting a PUCCH that provides a HARQ-ACK information prior to the UE establishing a dedicated RRC connection with repetitions is provided: (1) an indication in Msg1 and/or (2) an indication in Msg3 PUSCH.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration μ as $2^\mu$. 15 kHz. A unit of one sub-carrier over one symbol is referred to as resource element (RE). A unit of one RB over one symbol is referred to as physical RB (PRB).

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A PDCCH transmission is over a number of control channel elements (CCEs) from a predetermined set of numbers of CCEs referred to as CCE aggregation level.

A PDSCH transmission is scheduled by a DCI format or is semi-persistently scheduled (SPS) as configured by higher layers and activated by a DCI format. A PDSCH reception by a UE provides one or more transport blocks (TBs), wherein a TB is associated with a HARQ process that is indicated by a HARQ process number field in a DCI format scheduling the PDSCH reception or activating a SPS PDSCH reception and a redundancy version (RV) that is indicated by a RV field in the DCI format when incremental redundancy is used for encoding the TB. A TB transmission can be an initial one or a retransmission as identified by a new data indicator (NDI) field in the DCI format scheduling a PDSCH reception that provides a TB retransmission for a given HARQ process number.

A gNB transmits one or more of multiple types of RS including channel state information RS (CSI-RS) and demodulation RS (DM-RS). A CSI-RS is primarily intended for UEs to perform measurements and provide CSI to a gNB. For channel measurement or for time tracking, non-zero power CSI-RS (NZP CSI-RS) resources are used. For interference measurement reports (IMRs), CSI interference measurement (CSI-IM) resources are used. The CSI-IM resources can also be associated with a zero power CSI-RS (ZP CSI-RS) configuration. A UE can determine CSI-RS reception parameters through DL control signaling or higher layer signaling, such as radio resource control (RRC) signaling from a gNB. A DM-RS is typically transmitted only within a BW of a respective PDCCH or PDSCH and a UE can use the DM-RS to demodulate data or control information.

A UE typically monitors multiple candidate locations for respective potential PDCCH receptions to decode multiple DCI formats in a slot, for example as described in 3GPP TS 38.213 v17.3.0, "NR; Physical Layer Procedures for Control.". A DCI format includes cyclic redundancy check (CRC) bits in order for the UE to confirm a correct detection of the DCI format. A DCI format type is identified by a radio network temporary identifier (RNTI) that scrambles the CRC bits.

For a DCI format scheduling a PDSCH or a PUSCH to a single UE, the RNTI can be a cell RNTI (C-RNTI), or a configured scheduling RNTI (CS-RNTI), or an MCS-C-RNTI and serves as a UE identifier. In the following, for brevity, only the C-RNTI may be referred to when needed. A UE typically receives/monitors PDCCH for detections of DCI formats with CRC scrambled by a C-RNTI according to a UE-specific search space (USS). For a DCI format 0_0 and a DCI format 1-0 that schedule PUSCH transmissions and PDSCH receptions, respectively, to a UE, the UE can additionally be configured to monitor corresponding PDCCH according to common search space (CSS). For a DCI format 0_1 and a DCI format 0_2 that are mainly used to schedule PUSCH transmissions or for a DCI format 1_1 and a DCI format 1_2 that are mainly used to schedule PDSCH receptions, the UE monitors corresponding PDCCH according to a USS. PDCCH monitoring implies reception of PDCCH candidates and decoding of potential DCI formats.

For a DCI format 1_3 that is used for the scheduling of one PDSCH in one cell, or multiple PDSCHs in multiple cells with one PDSCH per cell, if the UE is provided by a higher layer parameter a number of sets of serving cells and is provided USS sets to monitor PDCCH for detection of DCI format 1_3, the UE separately applies procedures for determining a corresponding second Type-2 HARQ-ACK sub-codebook associated with DCI format 1_3 scheduling PDSCH receptions on more than one serving cells from a set of serving cells from the procedures for determining a first Type-2 HARQ-ACK sub-codebook when a DCI format does not schedule PDSCH receptions on more than one serving cells. The UE concatenates the second Type-2 HARQ-ACK sub-codebook to a first Type-2 sub-codebook that the UE determines in association with unicast SPS PDSCH receptions or with any unicast DCI format scheduling PDSCH reception on a single serving cell, or having associated HARQ-ACK information without scheduling a PDSCH reception.

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. A UE monitors PDCCH for these DCI formats according to corresponding CSS sets on a primary cell. There are also a number of other RNTIs provided to a UE by UE-specific RRC signaling and are associated with DCI formats providing various control information and have corresponding PDCCHs that a UE monitors according to a Type-3 CSS on the primary cell or on a secondary cell as described in 3GPP TS 38.213 v17.3.0, "NR; Physical Layer Procedures for Control.". Such DCI formats include a DCI format 2_0 providing a structure of a slot in term of DL, UL or flexible/reserved symbols over a number of slots, a DCI format 2_2 providing transmit power control (TPC) commands for PUSCH or PUCCH transmissions, a DCI format 2_3 providing TPC commands for SRS transmissions and also potentially triggering a SRS transmission on a number of cells, and so on, and a corresponding CSS is referred to as Type3-PDCCH CSS.

UL signals also include data signals conveying information content, control signals conveying UL control information (UCI), DM-RS associated with data or UCI demodulation, phase-tracking RS (PT-RS) used for phase tracking in symbols of a PUSCH, and sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of symbols in a slot including one symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UL RS includes DM-RS, PT-RS, and SRS. DM-RS is typically transmitted within a BW of a respective PUSCH or PUCCH. A gNB can use a DM-RS to demodulate information in a respective PUSCH or PUCCH. SRS is transmitted by a UE to provide a gNB with an UL CSI and, for a TDD system, to also provide a PMI for DL transmission. Further, as part of a random access procedure or for other purposes, a UE can transmit a physical random access channel (PRACH).

UCI includes HARQ-ACK information, indicating correct or incorrect decoding of TB s or of code block groups (CBGs) in a PDSCH, scheduling request (SR) indicating whether a UE has data in its buffer to transmit, and CSI reports enabling a gNB to select appropriate parameters for PDSCH/TB or PDCCH/DCI format transmissions to a UE. A UE transmits a PUCCH on a primary cell of a cell group. HARQ-ACK information is either a positive acknowledgement (ACK) when a TB decoding is correct or a negative acknowledgement (NACK) when a TB decoding is incorrect. An ACK can be represented by a binary "1" value and a NACK can be represented by a binary "0" value.

DL receptions and UL transmissions by a UE can be configured to occur in a corresponding DL bandwidth part (BWP) and UL BWP. A DL/UL BWP is smaller than or equal to a DL/UL bandwidth of a serving cell. DL transmissions from a gNB and UL transmissions from a UE can be based on an orthogonal frequency division multiplexing (OFDM) waveform including a variant using DFT precoding that is known as DFT-spread-OFDM.

A UE multiplexes HARQ-ACK information associated with DCI formats, such as DCI format scheduling PDSCH receptions, in a PUCCH that the UE transmits in a slot indicated by a value of PDSCH-to-HARQ_feedback timing indicator field in a last DCI format associated with the HARQ-ACK information and indicating the slot. A value $K_1$ of the field can be from a set of slot timing values $K_1$ or can be indicated by higher layers as in case of a SPS PDSCH receptions. When a UE has received UE-specific RRC signaling providing PUCCH resource sets, the UE determines a PUCCH resource set based on a UCI payload to multiplex in a PUCCH and determines a PUSCH resource within the PUCCH resource set based on a PUCCH resource index (PRI) in the DCI format.

A RA procedure can be initiated to fulfill one of the following purposes: establish RRC connection (to go from RRC_IDLE to RRC_CONNECTED), re-establish RRC connection after radio link failure (RLF), on-demand system information (SI) request, UL synchronization, SR, positioning, link recovery—also known as beam failure recovery (BFR). Physical random access procedure is triggered upon request of a PRACH transmission by higher layers or by a PDCCH order. RA can operate in two modes: (i) contention-based random access (CBRA) where UEs within a serving cell can share same RA resources and there is therefore a possibility of collision among RA attempts from different UEs, and (ii) contention-free random access (CFRA) where a UE has dedicated RA resources that are indicated by a serving gNB and may not be shared with other UEs so that RA collisions can be avoided.

A 4-step random access procedure, also known as a Type-1 L1 random access procedure includes step-1: a UE transmission of a physical random access channel (PRACH) preamble (Msg 1); step-2: a gNB transmission of RAR message with a PDCCH/PDSCH (Msg2); step-3: a UE transmission of a contention resolution message and when applicable, the transmission of a PUSCH scheduled by a RAR UL grant (Msg3); and step-4: gNB transmission of a contention resolution message (Msg4). An alternative RA procedure can include only two steps, referred to herein as 2-step RA or a Type-2 L1 random access procedure. In two step RA, Msg1 and Msg3 are combined into a MsgA transmission and Msg2 and Msg4 are combined into a MsgB reception. MsgA combines a PRACH preamble transmission in a RACH occasion (RO) along with a PUSCH transmission in a PUSCH occasion (PO).

Prior to initiation of the physical random access procedure, Layer 1 receives from higher layers a set of SS/PBCH block indexes and provides to higher layers a corresponding set of RSRP measurements. Layer 1 receives the configuration of PRACH transmission parameters (PRACH preamble format, time resources, and frequency resources for PRACH transmission). UE transmits a PRACH using the selected PRACH format with the transmission power determined depending on whether the PRACH transmission is triggered upon request by higher layers or is in response to a detection of a PDCCH order by the UE, and depending on the action associated to the PDCCH order.

A RAR is a PDCCH/PDSCH transmission that the UE receives on a DL BWP of a SpCell: the initial DL BWP of the PCell/SpCell for the case of initial access, i.e., (re-) establishing RRC connection, or the active DL BWP (with the same BWP-index as the active UL BWP) of an SpCell for other random access triggers except for initial access. If the active DL BWP index (of the SpCell) is not equal to active UL BWP index (of the serving cell), then switch the active DL BWP to one with the same BWP index. The SCS for PDCCH in RAR message is the SCS for Type1-PDCCH CSS set. The SCS for any future PDSCH is also the same SCS as that for PDSCH in RAR, unless the UE is configured an SCS. The PDCCH for RAR is a DCI format 1_0, or DCI format 1_3, that the UE monitors, during a certain configured time window, in Type 1-PDCCH CSS set of the SpCell identified by the RA-RNTI or, for the case of BFR with CFRA, in the search space indicated by recoverySearchSpaceId of the SpCell identified by the C-RNTI. The PDSCH part of RAR contains the gNB response.

For the case of CFRA based BFR, receiving a PDCCH during the time window and in the indicated search space of SpCell and addressed correctly to the C-RNTI is sufficient to consider RAR to be successful. For other cases, such as contention-based random access (CBRA) and SI request, RAR is successful if (i) a PDCCH in the Type1-PDCCH CSS set of the SpCell is received during the configured time window and is addressed to the RA-RNTI; and (ii) the corresponding PDSCH is correctly decoded; and (iii) the MAC RAR contained in PDSCH part of RAR contains a random access preamble ID (RAPID); and (iv) the RAPID in MAC RAR matches the preamble selected and transmitted by the UE in Msg1. Then, the UE, for the serving cell where PRACH preamble/Msg1 was transmitted, applies the TA to adjust/correct the timing between UE and gNB, stores TC-RNTI for use in future transmission, and processes the RAR UL grant to transmit Msg3.

For the case of CFRA or SI request, a correct reception of Msg2/RAR is the last step for the random access procedure. For the case of CBRA, multiple UEs may have used the same preamble, and further steps are needed to resolve the contention. Furthermore, for the case of random access before RRC_CONNECTED state (i.e., for initial access), UE and gNB need to exchange further information to set up the connection: an uplink PUSCH transmission (Msg3) for contention resolution request and possibly also for connection setup request, and a downlink transmission (Msg4) for contention resolution response and possibly for connection setup response. The contention resolution (and connection set up, if applicable) is considered successful if the UE receives Msg4 within a certain time window after transmission of Msg3 and, for the case that the UE does not have a C-RNTI yet, if the contention resolution ID in Msg4 matches the ID that the UE transmitted in Msg3. Otherwise, the RACH attempt is considered unsuccessful, and the UE needs to make another RACH attempt, unless the configured maximum number of RACH attempts have been already exhausted, in which case the entire random access procedure is declared as unsuccessful.

In response to a PUSCH transmission scheduled by a RAR UL grant when a UE has not been provided a C-RNTI, the UE attempts to detect a DCI format 1_0 with CRC scrambled by a corresponding TC-RNTI scheduling a PDSCH that includes a UE contention resolution identity. In response to the PDSCH reception with the UE contention resolution identity, the UE transmits HARQ-ACK information in a PUCCH. The PUCCH transmission is within a same active UL BWP as the PUSCH transmission. A minimum time between the last symbol of the PDSCH reception and the first symbol of the corresponding PUCCH transmission with the HARQ-ACK information is equal to $N_{T,1}+0.5$ msec. $N_{T,1}$ is a time duration of $N_1$ symbols corresponding to a PDSCH processing time for UE processing capability 1 when additional PDSCH DM-RS is configured.

When the UE transmits a PUCCH that provides HARQ-ACK information in response to the PDSCH reception scheduled by a DCI format 1_0, a PUCCH resource a PUCCH resource set is provided by pucch-ResourceCommon through an index to a row of a table for transmission of HARQ-ACK information on PUCCH in an initial UL BWP. The table includes sixteen rows corresponding to sixteen resources, each corresponding to a PUCCH format, a first symbol, a duration, a PRB offset, and a cyclic shift index set for a PUCCH transmission. If the UE provides HARQ-ACK information in a PUCCH transmission in response to detecting a DCI format scheduling a PDSCH reception or having associated HARQ-ACK information without scheduling a PDSCH reception, the UE determines a PUCCH resource with index $r_{PUCCH}$, $0 \leq r_{PUCCH} \leq 15$, as $$r_{PUCCH} = \left\lfloor \frac{2 \cdot n_{CCE,0}}{N_{CCE}} \right\rfloor + 2 \cdot \Delta_{PRI},$$

as where $N_{CCE}$ is a number of CCEs in a CORESET of a PDCCH reception with the DCI format, $n_{CCE,0}$ is the index of a first CCE for the PDCCH reception, and $\Delta_{PRI}$ is a value of the PUCCH resource indicator field in the DCI format.

When detecting a DCI format in response to a PUSCH transmission scheduled by a RAR UL grant, or corresponding PUSCH retransmission scheduled by a DCI format 0_0 with CRC scrambled by a TC-RNTI provided in the corresponding RAR message, the UE may assume the PDCCH carrying the DCI format has same DM-RS antenna port quasi co-location properties as for a SS/PBCH block the UE used for PRACH association regardless of whether or not the UE is provided TCI-State for the CORESET where the UE receives the PDCCH with the DCI format.

Ensuring a reception reliability for UL channels is particularly challenging in non-terrestrial networks (NTN) compared with terrestrial networks due to the limited link-budget associated with a larger path-loss. A NTN is a network using RF resources on board satellites or unmanned aerial service (UAS) platforms. A NTN includes satellites that can be geostationary Earth orbiting (GEO) satellites served by one or several sat-gateways that are deployed across the satellites targeted coverage or low Earth orbit (LEO) satellites served successively by one or several satellite-gateways at a time, a radio link between a sat-gateway and the satellite or UAS platform, a radio link between the UE and the satellite or UAS platform. A satellite or UAS platform may implement either a transparent or a regenerative (with on board processing) payload. The satellite or UAS platform typically generates several beams over a given service area bounded by its field of view which depends on the on board antenna diagram and elevation angle. The footprint of a beam has an elliptic shape and is considered as a cell in terrestrial networks.

In order to improve a reception reliability of a PUCCH transmitted by a UE, the UE can transmit the PUCCH with repetitions. The PUCCH can provide HARQ-ACK information in response to a PDSCH reception scheduled by a DCI format 1_0 with CRC scrambled by a TC-RNTI for a Type-1 RA procedure, or can provide HARQ-ACK information having ACK value if the RAR message(s) is for successRAR for a Type-2 RA procedure or, in general, HARQ-ACK information before receiving information by UE-specific RRC signaling for PUCCH resources.

A number of repetitions for a PUCCH transmission with HARQ-ACK information can be provided in a SIB, for example an RRC parameter numberOfPUCCHforMsg4HARQACK-RepetitionsList provides the number of repetitions, or, when the PUCCH transmission provides HARQ-ACK information associated with a DCI format, and more than one value is provided by the SIB, for example an RRC parameter numberOfPUCCHforMsg4HARQACK-RepetitionsList provides more than one value for the number of repetitions, can be also indicated by the DCI format. The indication can be based on a separate field in the DCI format that indicates a number of repetitions for the PUCCH transmission, or can be included in the configuration of PUCCH resources and a PUCCH resource can be indicated by the DCI format. In addition to parameters such as a PUCCH format, a starting symbol and a number of symbols, or a starting RB and a number of RB s, a PUCCH resource can also include a number of repetitions for a PUCCH transmission using the PUCCH resource.

A UE may need to transmit a PUCCH with HARQ-ACK information using resources that are indicated by a SIB, such as when the PUCCH transmission is prior to the UE establishing a dedicated RRC connection with a serving gNB, or after the UE has a dedicated RRC connection with the gNB and the gNB does not provide PUCCH resource sets to the UE by UE-specific RRC signaling.

Therefore, there is a need to enable a UE to transmit a PUCCH with repetitions when the UE is not provided PUCCH resources by UE-specific RRC signalling.

There is another need to indicate to a UE a number of repetitions for a PUCCH transmission when the UE is not provided PUCCH resources by UE-specific RRC signalling.

Finally, there is another need for a gNB to identify whether a UE is capable of transmitting a PUCCH with repetitions before the UE establishes an RRC connection with the gNB.

In the present disclosure, various embodiments of the disclosure may be implemented for a UE that transmits a PUCCH with repetitions with one repetition per slot or with multiple repetitions within a slot.

In the present disclosure, various embodiments of the disclosure may be implemented for a UE that transmits a PUCCH prior to the UE establishing an RRC connection for a Type-1 RA procedure or a Type-2 RA procedure.

In the present disclosure, various embodiments of the disclosure may be implemented for a UE that transmits a PUCCH when the UE does not have dedicated PUCCH resources, wherein the PUCCH transmission is after a PUSCH transmission scheduled by a configured grant in a RACH-less handover procedure.

In the present disclosure, various embodiments of the disclosure may be implemented for a UE that transmits a PUCCH when dedicated PUCCH resource configuration is not provided and the PUCCH is transmitted with a number of repetitions that is indicated in a SIB and/or in a DCI format, wherein the DCI format is scrambled by a TC-RNTI or by a C-RNTI, and the DCI format is DCI format 1_0 that schedules a PDSCH reception for which the PUCCH can provide HARQ-ACK information in response.

In the present disclosure, unless otherwise explicitly noted, providing a parameter value by higher layers includes providing the parameter value by a SIB, such as a SIB1, or by a common RRC signaling, or by UE-specific RRC signaling.

In the present disclosure, it may consider that a UE transmits a PUCCH using a PUCCH resource indicated by a SIB. For brevity, the following descriptions are with reference to DCI format 1_0 but are also directly applicable for any DCI format scheduling PDSCH receptions as a UE can be provided by UE-specific RRC signaling search space sets to monitor PDCCH for any such DCI format but may not be provided by UE-specific RRC signaling PUCCH resources.

In the present disclosure, the terms "PUCCH transmission with repetitions for Msg4 HARQ-ACK," "PUCCH transmission with repetitions when the UE does not have dedicated PUCCH resources," "PUCCH transmission with repetitions using PUCCH resources indicated by a SIB," or "PUCCH transmission with repetitions when a dedicated PUCCH resource configuration is not provided" are used interchangeably.

The descriptions in this disclosure consider that a UE that does not have dedicated PUCCH resource configuration and indicates a capability or a request to transmit with repetitions a PUCCH with HARQ-ACK information, determines a number of $$N_{PUCCH}^{repeat}$$

slots for repetitions of a PUCCH transmission with HARQ-ACK information based on an indication by numberOfPUCCHforMsg4HARQACK-RepetitionsList and if numberOfPUCCHforMsg4HARQACK-RepetitionsList provides more than one values, a field in a DCI format 1_0 scheduling a PDSCH reception that includes a UE contention resolution identity indicates of $$N_{PUCCH}^{repeat}$$

from the more than one values.

The UE transmits the $$N_{PUCCH}^{repeat}$$

PUCCH repetitions over a number of $$N_{PUCCH}^{repeat}$$

slots that can be consecutive or non-consecutive, wherein the availability of a slot can be subject to a configuration, or to a scheduling of other higher priority signals in the same time and/or frequency resources, or to the number of symbols available for the PUCCH transmission is smaller than the value provided by nrofSymbols for the corresponding PUCCH format. When the UE is configured to transmit the PUCCH repetitions on available slots, the UE transmits the $$N_{PUCCH}^{repeat}$$

PUCCH repetitions over a number of $$N_{PUCCH}^{repeat}$$

slots that may or may not be consecutive slots. When the UE is not configured to transmit the PUCCH repetitions on available slots, the UE transmits PUCCH repetitions over a number of $$N_{PUCCH}^{repeat}$$

consecutive slots, and if any of the $$N_{PUCCH}^{repeat}$$

consecutive slots is unavailable for PUCCH transmission, the UE transmits the PUCCH with a number of repetitions less than $$N_{PUCCH}^{repeat}.$$

An indication of a number of repetitions for a PUCCH transmission with HARQ-ACK information from a UE when the UE is not provided PUCCH resource sets by UE-specific RRC signaling.

A DCI format can include a field that indicates to a UE whether or not a PUCCH transmission with HARQ-ACK information is with repetitions. For example, one bit from a field in a DCI format 1_0 that schedules a PDSCH reception can indicate that transmission of a PUCCH with corresponding HARQ-ACK information is with repetitions if set to 1 or without repetitions if set to 0, or vice versa. For example, the bit can be one of the bits of the MCS field, or TPC field, or DAI field, or RV field.

When a UE does not have dedicated PUCCH resource configuration and transmits a PUCCH with HARQ-ACK information with repetitions, the UE determines a number of $$N_{PUCCH}^{repeat}$$

slots for repetitions of a PUCCH transmission with HARQ-ACK information based on an RRC parameter numberOfPUCCHforMsg4HARQACK-RepetitionsList (or numberOfPUCCHforHARQACK-CommonResources-RepetitionsList). When the RRC parameter provides a single value for the number of PUCCH repetitions, a DCI format scheduling a PDSCH reception may include a UE contention resolution identity includes a 1-bit field or a 2-bit field to indicate a value from numberOfPUCCHforMsg4HARQACK-RepetitionsList (or numberOfPUCCHforHARQACK-CommonResources-RepetitionsList).

In one example, the UE disregards the indication provided by the field in the DCI format and transmits the PUCCH with HARQ-ACK information with the number of repetitions provided by the RRC parameter, or equivalently, the UE does not expect to receive the indication of the number of repetitions in the DCI format when the RRC parameter numberOfPUCCHforMsg4HARQACK-RepetitionsList provides a single value for the number of PUCCH repetitions.

In one example, whether the UE transmits the PUCCH with HARQ-ACK information with the number of repetitions indicated by the RRC parameter or transmits the PUCCH without repetitions depends on the indication in the 1-bit field or in the 2-bit field of the DCI format. A value "00" of the 2-bit field can indicate that the PUCCH with HARQ-ACK information is transmitted with the number of repetitions provided in numberOfPUCCHforMsg4HARQACK-RepetitionsList, and a value different than "00" of the 2-bit field can indicate that the PUCCH with HARQ-ACK information is transmitted without repetitions, or vice versa. It is possible that a value "11" of the 2-bit field can indicate that the PUCCH with HARQ-ACK information is transmitted with the number of repetitions provided in numberOfPUCCHforMsg4HARQACK-RepetitionsList, and a value different than "11" of the 2-bit field can indicate that the PUCCH with HARQ-ACK information is transmitted without repetitions, or vice versa.

A UE that is not provided PUCCH resources by RRC-specific signaling can be indicated by a MAC CE in a PDSCH reception to transmit a PUCCH with HARQ-ACK information with repetitions. Different types of MAC CEs may be used to indicate transmission of PUCCH with repetitions for a Type-1 RA procedure and for a Type-2 RA procedure.

When a UE transmits a Msg3 PUSCH with repetitions, the UE can determine whether or not to transmit with repetitions a PUCCH with HARQ-ACK information in response to a PDSCH reception. A number of repetitions for the PUCCH transmission can be determined from a number of repetitions of a last PUSCH transmission, such as a Msg3 PUSCH transmission or a MsgA PUSCH transmission, through a mapping that can be defined in the specifications of the system operation or provided by a SIB. The last PUSCH transmission can be restricted to be one providing an initial transmission of a transport block. For example, when a last PUSCH transmission was with one of {1, 2, 4, 8} repetitions, a subsequent PUCCH transmission can be with {1, 1, 2, 4} repetitions, for example when there is a 3 dB link budget difference between a reference TB size in a PUSCH and 1 bit of HARQ-ACK information in a PUCCH for corresponding target block error rates, such as 10% for the TB and 1% for the HARQ-ACK information bit.

When a UE transmits a PRACH with repetitions, the UE can also transmit with repetitions a PUCCH that provides HARQ-ACK information in response to a PDSCH reception. A similar mapping for the numbers of repetitions as between a PUSCH transmission and a PUCCH transmission can apply for the numbers of repetitions of a PRACH transmission and a PUCCH transmission and can be defined in the specifications of the system operation or be indicated in a SIB.

Further, a number of repetitions for a PUCCH transmission can be based on an RSRP measurement by the UE, for example based on a SS/PBCH block, and a SIB can indicate a mapping among RSRP ranges and numbers of repetitions for a PUCCH transmission. For example, when the RSRP measurement is larger than or equal to a first value indicated in the SIB, the UE transmits the PUCCH without repetitions; when the RSRP measurement is smaller than the first value and larger than or equal than a second value indicated in the SIB, the UE transmits the PUCCH with a first number of repetitions indicated in the SIB or defined in the specifications of the system operation such as 2; when the RSRP measurement is smaller than the second value and larger than or equal to a third value indicated in the SIB, the UE transmits the PUCCH with a second number of repetitions indicated in the SIB or defined in the specifications of the system operation such as 4; and so on.

Figure 6:
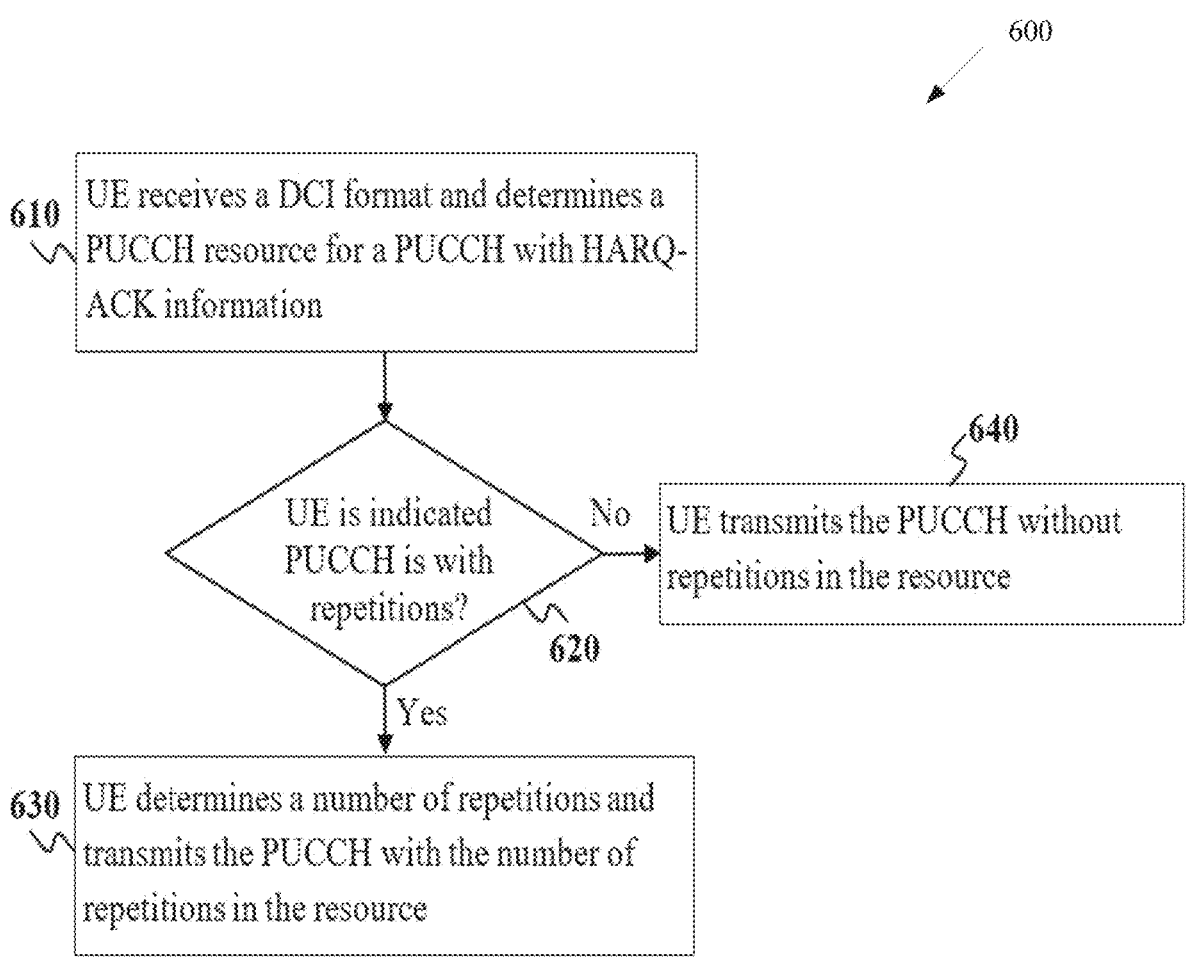
FIG. 6 illustrates a flowchart of UE procedure to determine whether or not to transmit a PUCCH with repetitions based on an indication in a DCI format according to embodiments of the present disclosure.

FIG. 6 illustrates a flowchart of UE procedure 600 to determine whether or not to transmit a PUCCH with repetitions when the UE is not provided PUCCH resource sets by UE-specific RRC signaling based on an indication in a DCI format according to embodiments of the present disclosure. The UE procedure 600 as may be performed by a UE (e.g., 111-116 as illustrated in FIG. 1). An embodiment of the UE procedure 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

FIG. 6 illustrates an example procedure for a UE to determine whether or not to transmit a PUCCH with repetitions based on an indication in a DCI format, wherein the DCI format can be DCI format 1_0 or DCI format 1_1 or DCI format 1_2 or DCI format 1_3, according to the disclosure.

A UE receives a DCI format scheduling a PDSCH reception and determines a PUCCH resource for transmission of a PUCCH with HARQ-ACK information associated with the PDSCH reception 610. The UE determines whether the UE has received an indication by the DCI format to transmit the PUCCH with repetitions 620. When the UE receives the indication, the UE determines a number of repetitions, for example based on association with repetitions of another channel or based on measurements or based on another indication by the DCI format, and transmits the PUCCH with the number of repetitions in the determined PUCCH resource 940 as illustrated in FIG. 9; otherwise, the UE transmits the PUCCH without repetitions in the determined PUCCH resource 950 as illustrated in FIG. 9.

Figure 7:
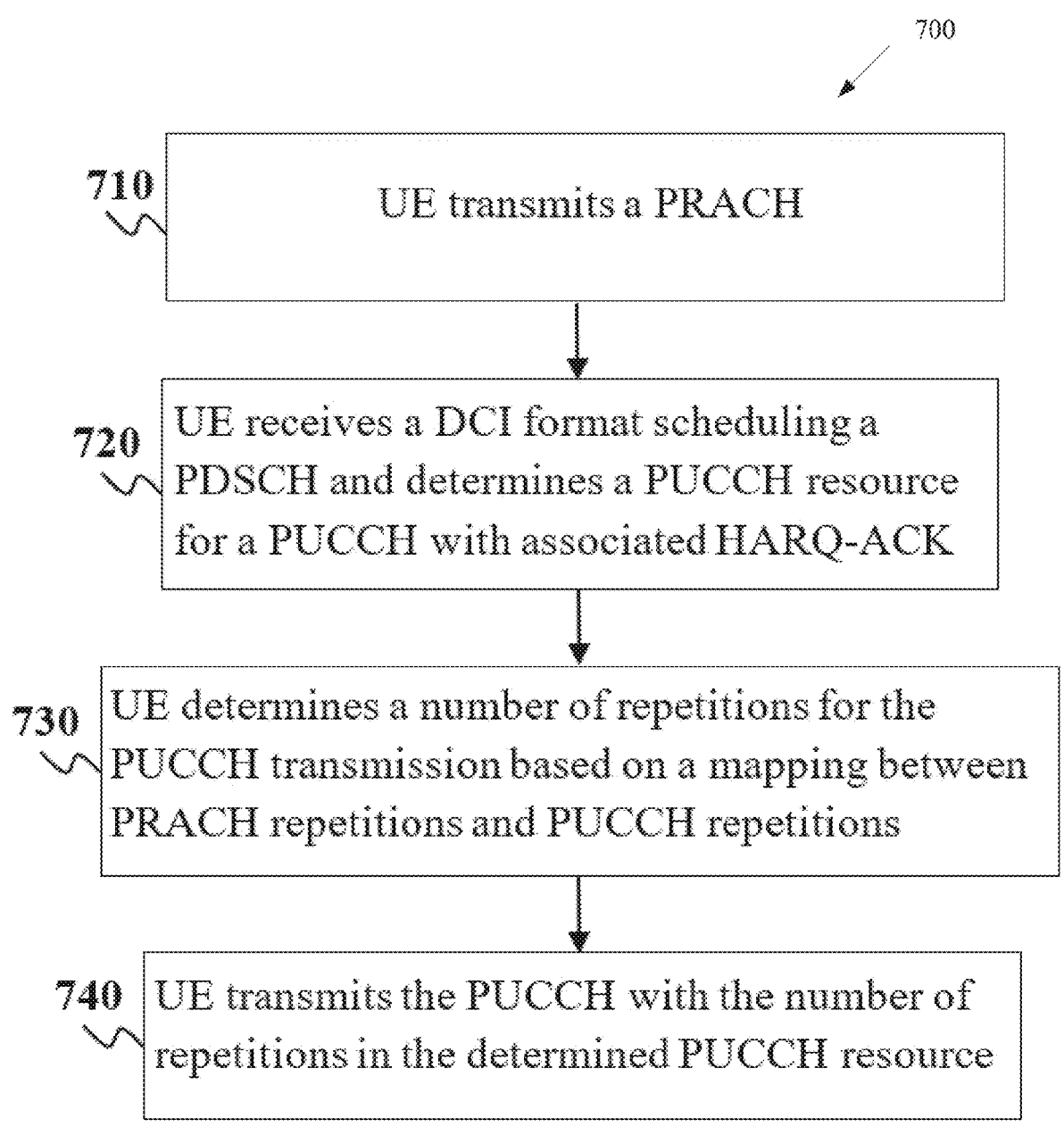
FIG. 7 illustrates a flowchart of UE procedure to determine whether or not to transmit a PUCCH with repetitions based on a PRACH transmission according to embodiments of the present disclosure.

FIG. 7 illustrates a flowchart of UE procedure 700 to determine whether or not to transmit a PUCCH with repetitions when the UE is not provided PUCCH resource sets by UE-specific RRC signaling based on a PRACH transmission according to embodiments of the present disclosure. The UE procedure 700 as may be performed by a UE (e.g., 111-116 as illustrated in FIG. 1). An embodiment of the UE procedure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

As illustrated in FIG. 7, a UE transmits a PRACH 710. The UE receives a DCI format scheduling a PDSCH reception and determines a PUCCH resource for transmission of a PUCCH with associated HARQ-ACK information 720. Based on a mapping between PRACH repetitions and PUCCH repetitions, the UE determines a number of repetitions for the PUCCH transmission 730, and transmits the PUCCH with the number of repetitions in the determined PUCCH resource 740.

In one embodiment, an indication of a number of repetitions for a PUCCH transmission with HARQ-ACK information by a DCI format is provided.

A DCI format can indicate a number of repetitions for a PUCCH transmission with HARQ-ACK information using bits from the payload of the DCI format. A DCI format 1_0 scheduling a PDSCH reception does not include a dedicated field for indicating a number of repetitions for a PUCCH transmission that provides HARQ-ACK information for the PDSCH reception. Moreover, as the size of DCI format 1_0 is fixed, such a field cannot be added. Therefore, the bits used for indicating a number of repetitions for the PUCCH transmission need to be obtained from fields that exist in DCI format 1_0.

In one example, some or all bits used for indicating a number of repetitions for a PUCCH transmission from a UE can be provided by a HARQ process number (HPN) field in DCI format 1_0. A HPN field in DCI format 1_0, includes 4 bits to indicate one from 16 HARQ processes that is associated with a transport block (TB) provided by a PDSCH reception that is scheduled by DCI format 1_0. However, when the UE is not indicated by UE-specific RRC signaling a number of HARQ processes, such as prior to establishing RRC connection with a serving gNB, a maximum number of HARQ processes is 8 and 1 bits from the HPN field, such as the most significant bit (MSB), can be used for indicating a number of repetitions for an associated PUCCH transmission.

Further, as a UE without RRC connection with the serving gNB is unlikely to require high data rates for communicating with the gNB, a number of HARQ processes can be smaller than 8, such as 4, and then 2 bits from the HPN field can be used for indicating a number of PUCCH repetitions. The possible number of repetitions for a PUCCH transmission can be defined in the specifications of the system operation or be indicated by a SIB. For example, when the number of repetitions is one of {1, 2, 4, 8}, the 2 MSBs of the HPN field in DCI format 1_0 can be used to indicate one of the four numbers.

In one example, a large modulation order, such as QAM 64, or a large code rate, such as above $\frac{2}{3}$, targeting high spectral efficiency or large data rates for PDSCH receptions by a UE are typically not applicable prior to the UE establishing RRC connection with a serving gNB. Therefore, only lower entries of a modulation and coding scheme (MCS) table that can be indicated by an MCS field in DCI format 1_0 scheduling a PDSCH reception can be useful. For example, for a MCS field that comprises of 5 bits, one or more bits can be used as part of a number of bits used for indicating a number of repetitions for the PUSCH transmission.

In one example, considering that when a UE transmits a PUCCH with repetitions, it is likely that the UE uses a maximum power, a TPC command field in DCI format 1_0 can be fully or partially used to indicate a number of repetitions. For example, DCI format 1_0 can indicate whether or not an associated PUCCH transmissions is with repetitions as previously described. If the PUCCH transmission is indicated to be without repetitions, a TPC command field is used to provide a TPC command for determining a power of the PUCCH transmission. If the PUCCH transmission is indicated to be with repetitions, the TPC command field is used to indicate the number of repetitions and a closed-loop power control (CLPC) component of a power control process for determining a PUCCH transmission power is not updated.

For example, for a TPC command field of 2 bits, a value can indicate 1, 2, 4, or 8 repetitions or a number of repetitions from a set of numbers of repetitions indicated by a SIB, or to scale an indicated number of repetitions. For example, for a TPC command field for 2 bits, one bit can be used to indicate a power adjustment of 0 dB or 3 dB while the other bit can be combined with a bit of another field, such as the HPN field or the MCS field, to indicate a number of repetitions. It is noted that one repetition means a single transmission of the PUCCH in one slot and is equivalent to no repetitions.

In one example, considering that PDSCH receptions prior to a UE establishing an RRC connection with a serving gNB are typically with low code rate and provide TBs with small sizes, use of incremental redundancy for a retransmission of a TB (when the UE indicates a NACK value for a previous transmission of the TB), can be avoided (chase combining is then used) or reduced such as by using one redundancy version (RV) instead of three RVs since practically all gains from HARQ retransmissions of a TB can be obtained with chase combining or with one additional RV for incremental redundancy. For example, for a DCI format 1_0, or DCI format 1_3, that includes an RV field of 2 bits, one bit can be used to indicate RV 0 or RV 2, and one bit can be used to indicate a number of repetitions (possibly in combination with one or more bits from another field as previously described).

Alternatively, if chase combining is used for HARQ retransmissions of a TB, both bits of the RV field in DCI format 1_0 can be used for indicating a number of repetitions for a PUCCH transmission associated with DCI format 1_0.

It is also possible to use bits from fields other than the HARQ process number field or the MCS field to indicate PUCCH repetitions. For example, 1 or more bits of a downlink assignment index (DAI) field of the DCI format 1_0, that comprises 2 bits can be used as part of a number of bits that are used to indicate the number of repetitions for the PUCCH, or 1 or 2 bits of a field of 2 reserved bits when the DCI format is monitored in common search space for operation in a cell in frequency range 2-2 and the number of bits for the field of "ChannelAccess-CPext" is 0 can be used.

Therefore, a number of repetitions for a PUCCH transmission from a UE when the UE is not provided PUCCH resources by UE-specific RRC signaling can be indicated by a DCI format scheduling the PDSCH transmission by using one or more bits of existing fields in the DCI format such as the HARQ process number field, the MCS field, the TPC command field, the DAI field, or the RV field, wherein the DCI format can be DCI format 1_0 or DCI format 1_1 or DCI format 1_2 or DCI format 1_3. As previously described, a bit from the aforementioned fields can be used to indicate whether or not the PUCCH transmission is with repetitions when the UE is not provided PUCCH resources by UE-specific RRC signaling and then an interpretation for the remaining bits can be determined as being a conventional one associated with the functionality of those fields or as indicating a number of repetitions for a PUCCH transmission from a UE.

It is also possible to determine whether or a not a PUCCH transmission is with repetitions based on an implicit indication such as for example when a previous PUSCH transmission is with a number of repetitions that is above a number that is predetermined or indicated in a SIB. Alternatively, the use of one more bits from the aforementioned fields can be defined in the specifications of the system operation as being used to indicate a number of repetitions for a PUCCH transmission from a UE when the UE is not provided PUCCH resources by UE-specific RRC signaling.

To indicate the number of repetitions for a PUCCH transmission, a number of bits in DCI format 1_0 can comprise bits from more than one of the HARQ process number, MCS, TPC, DAI, or RV fields, and can be the MSB or the LSB of the corresponding field. If the two or more bits for the indication of the number of repetitions for the PUCCH transmission are from a same field of DCI format 1_0, the two or more MSBs or the 2 or more LSBs of that field can be used and that can be defined in the specifications of the system operation. For example, for indicating one of four possible number of repetitions for a PUCCH transmission, including no repetition by indicating a number equal to one, two bits of the HPN field, or the MSB of the HPN field and the MSB of the MCS field, or the two MSBs of the MCS field, or the MSB of the HPN field and the MSB of the RV field, and so on, can be used.

Based on an indication by bits in a DCI format, wherein the DCI format can be DCI format 1_0 or DCI format 1_1 or DCI format 1_2 or DCI format 1_3, for example as previously described, a UE can determine a number of repetitions K for a PUCCH transmission in response to a PDSCH reception scheduled by the DCI format according to TABLE 1, based on whether or not the UE is provided, for example in a SIB, a higher layer parameter for example numberOfPUCCH-RepetitionsList or numberOfPUCCHforMsg4HARQACK-RepetitionsList or numberOfPUCCHforHARQACK-CommonResources-Repetitions-List.

When numberOfPUCCH-RepentionsList or numberOfPUCCHforMsg4HARQACK-RepetitionsList or numberOfPUCCHforHARQACK-CommonResources-Repetitions-List is not provided, a set of numbers of repetitions K (default values) for a PUCCH transmission can be predefined or defined in the specifications of the system operation, such as {1, 2, 4, 8} as in TABLE 1, or other default values (e.g., {1, 1, 1, 1}, {reserved, 2, 3, 4}, etc.). It is possible that when numberOfPUCCH-RepetitionsList or numberOfPUCCHforMsg4HARQACK-RepentionsList is not provided in SIB, the UE is not expected to receive the indication of number of repetitions for the PUCCH transmission in the DCI format, wherein the DCI format can be DCI format 1_0 or DCI format 1_1 or DCI format 1_2 or DCI format 1_3. This is equivalent to transmission of PUCCH without repetitions when the higher layer parameter including the number of repetitions is not configured in the SIB.

When numberOfPUCCH-RepentionsList or numberOfPUCCHforMsg4HARQACK-RepetitionsList or numberOfPUCCHforHARQACK-CommonResources-Repetitions-List is provided, a set of numbers of repetitions K for a PUCCH transmission is indicated by numberOfPUCCH-RepetitionsList or numberOfPUCCHforMsg4HARQACK-RepetitionsList or numberOfPUCCHforHARQACK-CommonResources-RepetitionsList.

TABLE 1

Mapping values of two bits in a DCI format to numbers of repetitions for a PUCCH
transmission associated with the DCI format

| numberOfPUCCH-RepetitionsList is configured | | numberOfPUCCH-RepetitionsList is not configured | |
|---|---|---|---|
| Codepoint | K | Codepoint | K |
| 00 | First value of numberOfPUCCH-RepetitionsList | 00 | 1 |
| 01 | Second value of numberOfPUCCH-RepetitionsList | 01 | 2 |
| 10 | Third value of numberOfPUCCH-RepetitionsList | 10 | 3 |
| 11 | Fourth value of numberOfPUCCH-RepetitionsList | 11 | 4 |

As previously described, the indication can be a 1-bit field in a DCI format or a 2-bit field in the DCI format, wherein the DCI format can be DCI format 1_0 or DCI format 1_1 or DCI format 1_2 or DCI format 1_3. For a 1-bit field, similar to the above example of 2-bit field, the UE can determine the number of repetitions K for a PUCCH transmission in response to a PDSCH reception scheduled by the DCI format according to TABLE 2, based on whether or not the UE is provided, for example in a SIB, a higher layer parameter for example numberOfPUCCH-RepetitionsList. When numberOfPUCCH-RepetitionsList is not provided, a set of numbers of repetitions K (default values) for a PUCCH transmission can be pre-defined or defined in the specifications of the system operation, such as $\{1, 1\}$ as in TABLE 2, $\{1, 2\}$, $\{1, 4\}$, 11, 81, $\{2, 2\}$, $\{2, 4\}$, $\{2, 8\}$, or $\{4, 8\}$.

It is possible that when numberOfPUCCH-RepetitionsList is not provided in SIB, the UE is not expected to receive the indication of number of repetitions for the PUCCH transmission in the DCI format, wherein the DCI format can be DCI format 1_0 or DCI format 1_1 or DCI format 1_2 or DCI format 1_3. This is equivalent to transmission of PUCCH without repetitions when the higher layer parameter including the number of repetitions is not configured in the SIB. When numberOfPUCCH-RepetitionsList is provided, a set of numbers of repetitions K, such as $\{1, 1\}$, $\{1, 2\}$, $\{1, 4\}$, $\{1, 8\}$, $\{2, 2\}$, $\{2, 4\}$, $\{2, 8\}$, or $\{4, 8\}$, for a PUCCH transmission is indicated by numberOfPUCCH-RepetitionsList.

numberOfPUCCH-RepetitionsList or, if numberOfPUCCH-RepetitionsList is not provided, an index from a set of K values defined in the specifications of the system operation.

FIG. 8 illustrates a flowchart of UE procedure 800 to transmit a PUCCH with a number of repetitions indicated by bits of a HARQ process number field in a DCI format according to embodiments of the present disclosure. The UE procedure 800 as may be performed by a UE (e.g., 111-116 as illustrated in FIG. 1). An embodiment of the UE procedure 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

FIG. 8 illustrates an example procedure for a UE to transmit a PUCCH with a number of repetitions indicated by bits of a HARQ process number field in a DCI format, wherein the DCI format can be DCI format 1_0 or DCI format 1_1 or DCI format 1_2 or DCI format 1_3, according to the disclosure.

A UE receives a DCI format indicating a PUCCH resource index for a PUCCH transmission with HARQ-ACK information 810. The UE determines a number of repetitions for the PUCCH transmission based on a value of one or more bits of an HPN field in the DCI format 820. The UE determines a PUCCH resource based on the indicated PUCCH resource index 830. The UE transmits the PUCCH with the determined number of repetitions in the determined PUCCH resource 840.

TABLE 2

Mapping values of two bits in a DCI format to numbers of repitions for a PUCCH transmission
associated with the DCI format

| numberOfPUCCH-RepetitionsList is configured | | numberOfPUCCH-RepetitionsList is not configured | |
|---|---|---|---|
| Codepoint | K | Codepoint | K |
| 0 | First value of numberOfPUCCH-RepetitionsList | 0 | 1 |
| 1 | Second value of numberOfPUCCH-RepetitionsList | 1 | 1 |

Instead of DCI format scheduling a PDSCH reception indicating a number of repetitions for an associated PUCCH transmission, the number of repetitions can be indicated by a MAC CE provided by the PDSCH reception. The MAC CE can indicate an index in a set of K values provided by When a UE is provided a threshold by rsrp-ThresholdPUCCHforMsg4HARQACK and is configured numberOfPUCCHforMsg4HARQACK-RepetitionsList that includes at least one value for the number of repetitions, based on an RSRP of a downlink pathloss reference compared to the threshold value in rsrp-ThresholdPUCCHforMsg4HARQACK, for example the RSRP is smaller than the threshold value, the UE indicates its capability of transmitting PUCCH with repetitions when the UE does not have dedicated PUCCH resources in Msg3, determines the number of PUCCH repetitions from the one or more values provided in numberOfPUCCHforMsg4HARQACK-RepetitionsList based on the indication in a DCI format scheduling a PDSCH reception that includes a UE contention resolution identity, and transmits the PUCCH with the determined number of repetitions.

When a UE is provided a threshold by rsrp-ThresholdPUCCHforMsg4HARQACK and is not configured numberOfPUCCHforMsg4HARQACK-RepetitionsList that includes at least one value for the number of repetitions, based on an RSRP of a downlink pathloss reference compared to the threshold value in rsrp-ThresholdPUCCHforMsg4HARQACK, for example the RSRP is smaller than the threshold value, the UE indicates its capability of transmitting PUCCH with repetitions when the UE does not have dedicated PUCCH resources in Msg3, and transmits the PUCCH without repetitions, or the UE can be configured to transmit the PUCCH with a number of repetitions indicated by the DCI format.

When a UE is not provided a threshold by rsrp-ThresholdPUCCHforMsg4HARQACK, regardless of whether the UE is configured numberOfPUCCHforMsg4HARQACK-RepetitionsList that includes at least one value for the number of repetitions, the UE indicates its capability of transmitting PUCCH with repetitions when the UE does not have dedicated PUCCH resources in Msg3 and transmits the PUCCH without repetitions.

When a UE is not provided a threshold by rsrp-ThresholdPUCCHforMsg4HARQACK, and is configured numberOfPUCCHforMsg4HARQACK-RepetitionsList that includes one value for the number of repetitions, the UE indicates its capability of transmitting PUCCH with repetitions when the UE does not have dedicated PUCCH resources in Msg3 and transmits the PUCCH with the number of repetitions provided by numberOfPUCCHforMsg4HARQACK-RepetitionsList.

When a UE is not provided a threshold by rsrp-ThresholdPUCCHforMsg4HARQACK, and is configured numberOfPUCCHforMsg4HARQACK-RepethionsList that includes more than one values for the number of repetitions, the UE indicates its capability of transmitting PUCCH with repetitions when the UE does not have dedicated PUCCH resources in Msg3, determines the number of PUCCH repetitions from the one or more values provided in numberOfPUCCHforMsg4HARQACK-RepetitionsList based on the indication in a DCI format scheduling a PDSCH reception that includes a UE contention resolution identity, and transmits the PUCCH with the determined number of repetitions.

An indication of a number of repetitions for a PUCCH transmission with HARQ-ACK information by an association with a PUCCH resource index is provided.

When a UE is not provided PUCCH resource sets by UE-specific RRC signalling, the UE uses a PUCCH resource set indicated by a SIB, such as SIB1, and a PUCCH resource index in a DCI format wherein the DCI format can be DCI format 1_0 or DCI format 1_1 or DCI format 1_2 or DCI format 1_3, indicates to a row of TABLE 3 that includes 16 PUCCH resources as described in 3GPP TS 38.213 v17.3.0, "NR; Physical Layer Procedures for Control.". Each PUCCH resource is associated with a PUCCH format, a first symbol, a duration, a PRB offset $$RB_{BWP}^{offset},$$

and a cyclic shift index set. For transmission of PUCCH with repetitions, each of the 16 resources in TABLE 3 can be associated with a number of repetitions. The association of PUCCH resources and values of number of repetitions can depend on the PUCCH format, and/or the first symbol, and/or the duration, and/or the PRB offset.

TABLE 3

| | | | | | |
|---|---|---|---|---|---|
| PUCCH resource sets before dedicated PUCCH resource configuration | | | | | |
| Index | PUCCH format | First symbol | Number of symbols | PRB offset $RB_{BWP}^{offset}$ | Set of initial CS indexes |
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $[N_{BWP}^{size}/4]$ | {0, 3, 6, 9} |

In one example, a SIB indicates an association of each of the 16 PUCCH resources corresponding to the 16 rows of TABLE 3 with a value of number of repetitions. For example, if the number of PUCCH repetitions can be any of the values {n1, n2, n3, n4}, the SIB can associate each of the 16 PUCCH resources, or equivalently each of the row indexes, of TABLE 3 with one of the {n1, n2, n3, n4} values as the number of repetitions for a PUCCH transmission using the PUCCH resource. It is also possible that for some of the PUCCH resources in TABLE 3, such as the ones associated with indexes 3-6 having 4 symbols, a number of repetitions is fixed to 1 and the number of repetitions is not indicated by the SIB in order to reduce additional signaling overhead.

In one example, in order to avoid any additional signaling overhead in a SIB, an association of a PUCCH resource index with a number of repetitions for a PUCCH transmission is defined in the specifications of the system operation, for example as in TABLE 4 with an additional column indicating a number of repetitions associated with a respective PUCCH resource.

TABLE 4

| | PUCCH format | First symbol | Number of symbols | PRB offset $RB_{BWP}^{offset}$ | Set of initial CS indexes | Number of PUCCH repetitions |
|---|---|---|---|---|---|---|
| Index | | | | | | |
| 0 | 0 | 12 | 2 | 0 | {0, 3} | 1 |
| 1 | 0 | 12 | 2 | 0 | {0, 4, 8} | 2 |
| 2 | 0 | 12 | 2 | 3 | {0, 4, 8} | 1 |
| 3 | 1 | 10 | 4 | 0 | {0, 6} | 1 |
| 4 | 1 | 10 | 4 | 0 | {0, 3, 6, 9} | 1 |
| 5 | 1 | 10 | 4 | 2 | {0, 3, 6, 9} | 1 |
| 6 | 1 | 10 | 4 | 4 | {0, 3, 6, 9} | 1 |
| 7 | 1 | 4 | 10 | 0 | {0, 6} | 1 |
| 8 | 1 | 4 | 10 | 0 | {0, 3, 6, 9} | 2 |
| 9 | 1 | 4 | 10 | 2 | {0, 3, 6, 9} | 4 |
| 10 | 1 | 4 | 10 | 4 | {0, 3, 6, 9} | 8 |
| 11 | 1 | 0 | 14 | 0 | {0, 6} | 1 |
| 12 | 1 | 0 | 14 | 0 | {0, 3, 6, 9} | 2 |
| 13 | 1 | 0 | 14 | 2 | {0, 3, 6, 9} | 4 |
| 14 | 1 | 0 | 14 | 4 | {0, 3, 6, 9} | 1 |
| 15 | 1 | 0 | 14 | $\lfloor N_{BWP}^{size}/4\rfloor$ | {0, 3, 6, 9} | 1 |

PUCCH resource sets supporting repetitions before dedicated PUCCH resource configuration When a UE does not have dedicated PUCCH resource configuration for a PUCCH transmission with HARQ-ACK information, and a PUCCH resource set is provided through an index of a Table, such as TABLE 3 where each index is additionally associated with a number of repetitions as indicated by a SIB or TABLE 4, the UE determines whether or not to transmit a PUCCH with repetitions based on an indication by a DCI format, wherein the DCI format can be DCI format 1_0 or DCI format 1_1 or DCI format 1_2 or DCI format 1_3, or based on an association to a number of PRACH or PUSCH repetitions as previously described.

FIG. 9 illustrates a flowchart of UE procedure 900 to transmit a PUCCH with a number of repetitions associated to a PUCCH resource based on a mapping provided by a SIB according to embodiments of the present disclosure. The UE procedure 900 as may be performed by a UE (e.g., 111-116 as illustrated in FIG. 1). An embodiment of the UE procedure 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

A UE is provided a PUCCH resource set for a PUCCH transmission with HARQ-ACK information 910. The UE is indicated by a SIB a number of repetitions for each PUCCH resource of the PUCCH resource set 920. The UE is indicated a PUCCH resource by a PRI field in a DCI format 930. The UE determines a number of repetitions for a PUCCH transmission using the PUCCH resource based on the mapping provided by the SIB 940. The UE transmits the PUCCH with the number of repetitions in the PUCCH resource 950.

Figure 10:
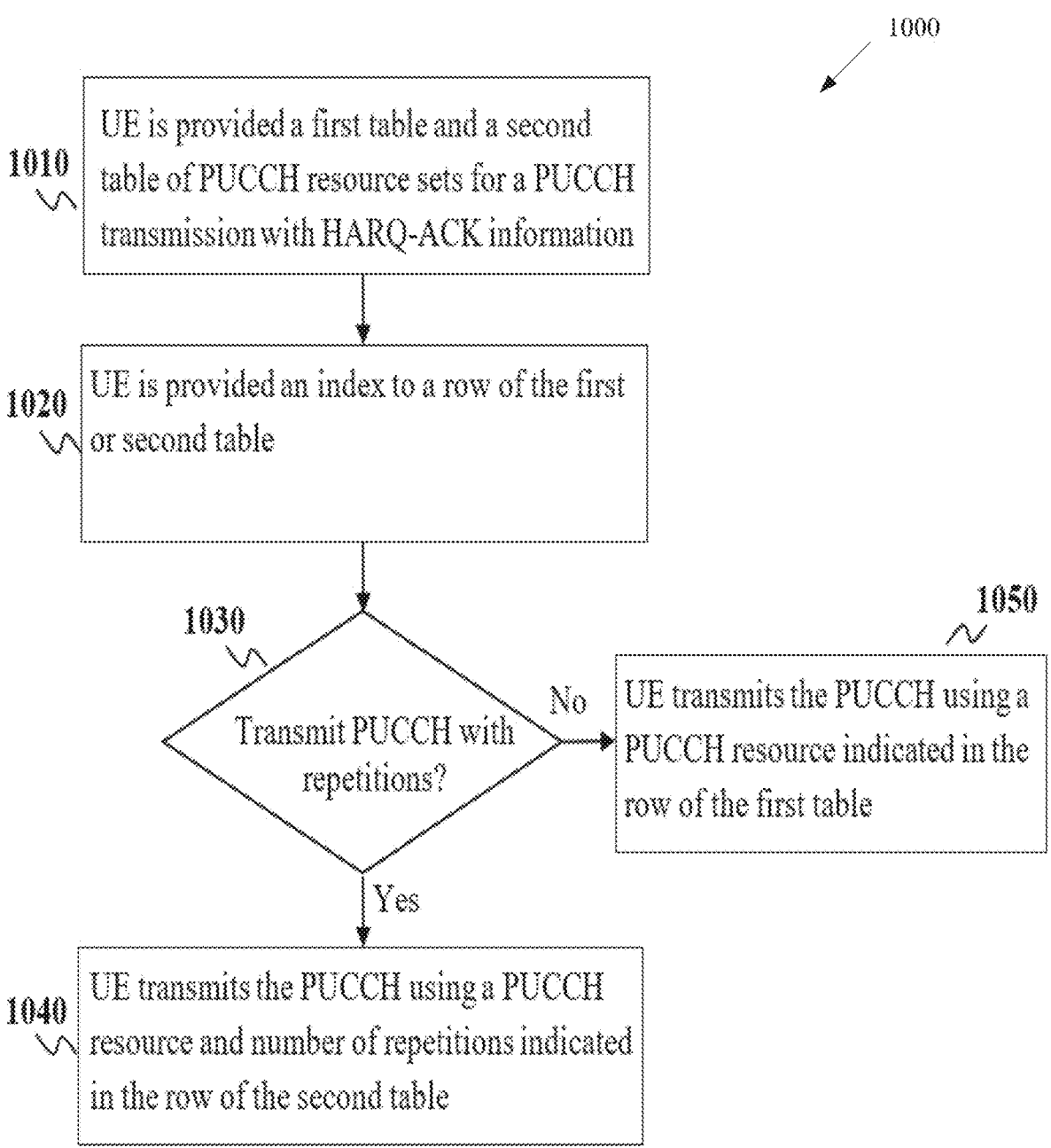
FIG. 10 illustrates a flowchart of UE procedure to transmit a PUCCH with a number of repetitions that is associated with a PUCCH resource in a table providing a PUCCH resource set according to embodiments of the present disclosure.

FIG. 10 illustrates a flowchart of UE procedure 1000 to transmit a PUCCH with a number of repetitions that is associated with a PUCCH resource in a table providing a PUCCH resource set according to embodiments of the present disclosure. The UE procedure 1000 as may be performed by a UE (e.g., 111-116 as illustrated in FIG. 1). An embodiment of the UE procedure 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

A UE is provided a first table and a second table of PUCCH resource sets for a PUCCH transmission with HARQ-ACK information, wherein the second table includes an additional column with a number of repetitions for each of the PUCCH resources 1010. The UE is provided an index to a row of the first or second table 1020. The UE determines whether the UE has received information to transmit the PUCCH with repetitions 1030. The information can be provided by a DCI format, wherein the DCI format can be DCI format 1_0, or by other means, for example based on a RSRP threshold criterion as is subsequently described. When the UE received the information to transmit the PUCCH with repetitions, the UE transmits the PUCCH using PUCCH resource and number of repetitions indicated in the row of the second table 1040; otherwise, the UE transmits the PUCCH using a PUCCH resource indicated in the row of the first table 1050.

An identification of a UE capable of transmitting a PUCCH that provides a HARQ-ACK information prior to the UE establishing a dedicated RRC connection with repetitions is provided.

A gNB can indicate a partition of PRACH resources according to a UE capability for repetitions of a PUCCH transmission with HARQ-ACK information when the UE does not have dedicated PUCCH resources (also referred in the following as the PUCCH feature, or capability for repetitions of a PUCCH transmission with HARQ-ACK information). A first partition can be for PRACH resources associated with support of the PUCCH feature and a second partition can be for PRACH resources associated with no support of the PUCCH feature. The UE can select a PRACH resource from the first or second partition of PRACH resources based on the UE capability of supporting or not the PUCCH feature. Alternatively, the UE can select the partition of PRACH resources based on an RSRP measurement, for example based on a SS/PBCH block reception, and an RSRP threshold indicated in a SIB or having a specified value, wherein the RSRP threshold can be specific to transmitting the PUCCH with repetitions or can be a threshold associated with more than one feature.

In one example, a gNB can configure a same RSRP threshold, rsrp-ThresholdMsg3, for transmission of Msg3 PUSCH with repetitions and transmission of PUCCH with HARQ-ACK information with repetition, for example in response to a PDSCH reception after the Msg3 PUSCH transmission. In another example, the gNB can indicate a separate RSRP threshold, rsrp-ThresholdHARQ-ACK-PUCCH or rsrp-ThresholdPUCCHforMsg4HARQACK, for repetitions of a PUCCH transmission with HARQ-ACK information, or generally a rsrp-ThresholdPUCCH, for repetitions of the PUCCH transmission when the UE is not provided PUCCH resource sets by UE-specific RRC signaling (UE-dedicated PUCCH resources). When a separate threshold for PUCCH is configured, similar to the case of Msg3 PUSCH with repetitions, based on the configured threshold and a measured RSRP, the UE indicates to the gNB its capability of transmitting the PUCCH with repetitions when the UE does not have dedicated PUCCH resources and/or its request to transmit PUCCH with repetitions, wherein the indication of UE capability and/or of UE request to transmit PUCCH with repetitions can be in Msg1 or in Msg3.

A partition of PRACH resources can be associated with more than one aspect or capability of a UE. For example, a partition of PRACH resources can be associated with support and/or a request of transmission with repetitions of a PUCCH with HARQ-ACK information and with support and/or a request of transmission with repetitions of a Msg3 PUSCH. It is possible that a partition of PRACH resources is for a combination of features that includes multiple PRACH transmissions, transmission with repetitions of a PUCCH with HARQ-ACK information when no dedicated PUCCH resources are provided to the UE, Msg3 PUSCH with repetitions. It is also possible that a first partition of ROs is configured for transmission with multiple PRACHs and a second partition of ROs is configured for a combination of Msg3 PUSCH with repetitions and PUCCH with repetitions when no dedicated PUCCH resources are provided to the UE, and a partition of PRACH preambles is shared among UEs that use first or second partition of ROs. Similar to the indication of UE capability and/or UE request to transmit PUCCH with repetitions in Msg1, the indication in Msg3 can be associated to more than one UE capabilities and/or requests.

An identification of a UE capable of transmitting with repetitions a PUCCH with HARQ-ACK information when the UE is not provided PUCCH resource sets by UE-specific RRC signaling (UE-dedicated PUCCH resources) by a gNB can be based on an indication by the UE in a Msg3 PUSCH transmission. In a 2-step RACH procedure, the UE indicates its capability of transmitting PUCCH with repetitions in MsgA PUSCH. In a RACH-less handover procedure, the UE indicates its capability or request of transmitting PUCCH with repetitions in a target cell (or in multiple target cells) in a PUSCH transmission to the target cell (or in the multiple PUSCH transmissions to the multiple cells) scheduled by a configured uplink grant (or by multiple uplink grants).

One advantage of identifying a UE supporting PUCCH repetitions in Msg3 PUSCH is when identification in Msg1/PRACH, for example by partitioning of PRACH preambles and/or ROs, is not configured in order to avoid fragmentation of PRACH resources. For example, if the gNB does not configures PRACH resources that can be used by the UE that have the capability/request of transmitting PUCCH with repetitions when the UE is not provided dedicated PUCCH resources, the UE can indicate its capability/request for PUCCH transmission with repetitions by providing the indication in Msg3 PUSCH (or in MsgA for 2-step RACH or in the first PUSCH transmission to the target cell in the RACH-less handover procedure).

In one example, for a UE capable of transmitting with PUCCH repetitions when the UE is not provided dedicated PUCCH resources, the UE determines whether there are PRACH resources configured by gNB for use by the UE capable of transmitting PUCCH with repetitions or not. If there are configured PRACH resources for such capability, or for a group of capabilities (wherein the capabilities are associated with priority indexes) that include the capability of transmitting PUCCH with repetitions when the UE is not provided dedicated PUCCH resources, the UE selects PRACH resources from the set of PRACH resources configured for such capability, otherwise the UE indicates its capability of transmitting PUCCH with repetitions when the UE is not provided dedicated PUCCH resources by an indication in Msg3.

Whether the UE selects the PRACH resources associated with the capability of PUCCH with repetitions or indicates the capability of PUCCH with repetitions in Msg3 can be subject, additionally or alternatively, to a configured threshold, if provided, and a measured RSRP relative to the configured threshold. If the configured threshold is not provided, or the measured RSRP is smaller or not larger than the configured threshold, the UE capable of transmitting with PUCCH repetitions when the UE is not provided dedicated PUCCH resources, can report its capability and/or request for PUCCH repetitions in Msg1 or in Msg3.

Figure 11:
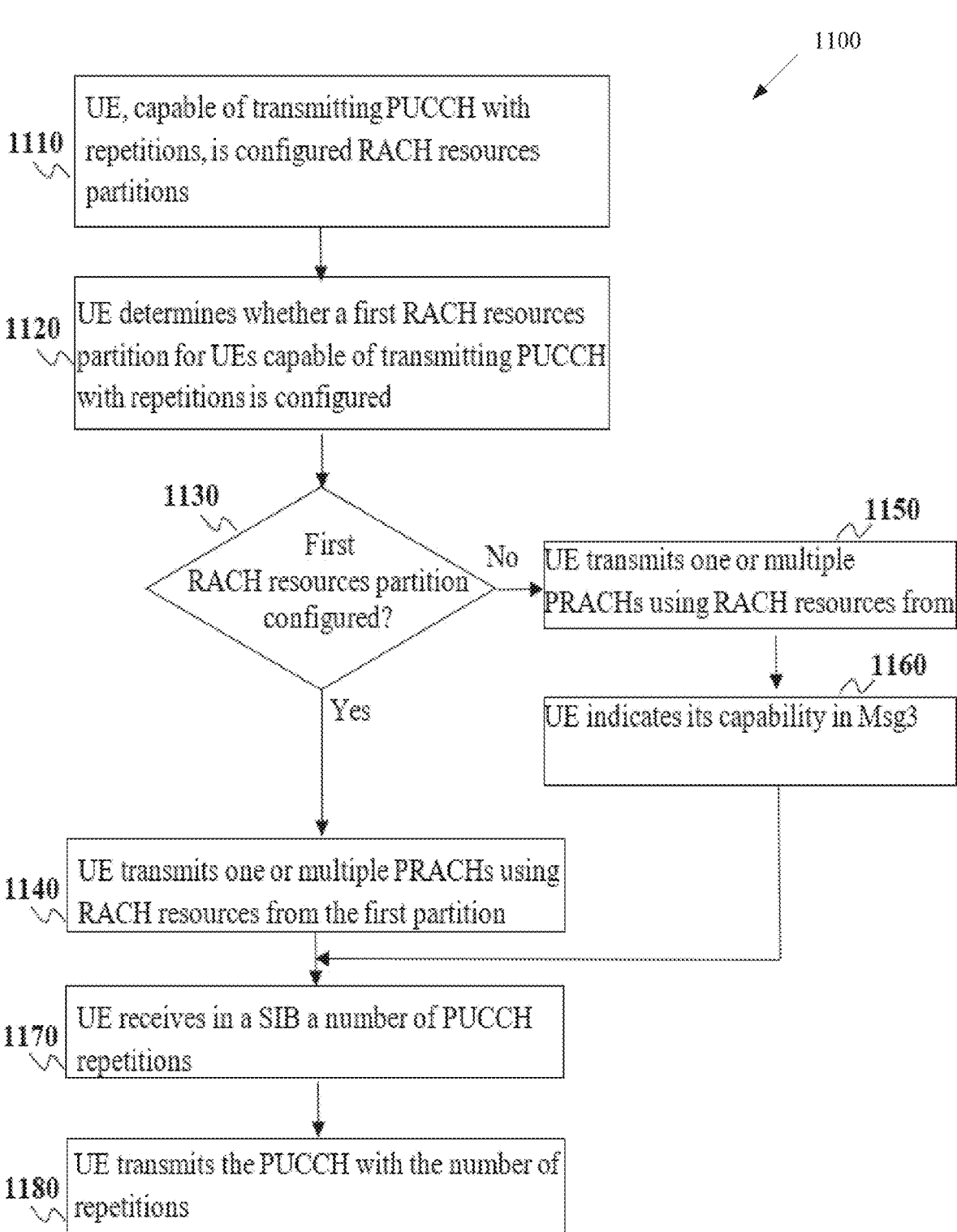
FIG. 11 illustrates a flowchart of UE procedure to transmit a PUCCH with repetitions according to embodiments of the present disclosure.

FIG. 11 illustrates a flowchart of UE procedure 1100 to transmit a PUCCH with repetitions according to embodiments of the present disclosure. The UE procedure 1100 as may be performed by a UE (e.g., 111-116 as illustrated in FIG. 1). An embodiment of the UE procedure 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11, a UE, capable of transmitting PUCCH with repetitions, is configured RACH resources partitions 1110. The UE determines whether a first RACH resources partition for UEs capable of transmitting PUCCH with repetitions is configured 1120. When the UE receives the first RACH resources partition 1130, the UE transmits one or multiple PRACHs using RACH resources from the first partition 1140, otherwise the UE transmits one or multiple PRACHs using RACH resources from a partition 1150 and indicates its capability in Msg3 1160. The UE receives in a SIB a number of PUCCH repetitions 1170. The UE transmits the PUCCH with the number of repetitions 1180. Thus, when the UE does not have a configuration of RACH resources that are associated to the UE capability or request of transmitting PUCCH with repetitions and the UE does not have a dedicated PUCCH resource configuration, the UE behavior is according to the branch labelled with "No" in FIG. 11.

Alternatively, or additionally to steps 1170 and 1180, as previously described, in step 1170 the UE can receive in SIB, for example in numberOfPUCCHforMsg4HARQACK-RepetitionsList, more than one values. Then, in step 1180, the UE can determine the number of repetitions of the PUCCH based on an indication, by a DCI format 1_0 scheduling a PDSCH reception that includes a UE contention resolution identity, of one value from the more than one values in numberOfPUCCHforMsg4HARQACK-RepetitionsList.

In one example, a field in a Msg3 PUSCH, such as a MAC CE or 1 bit multiplexed as UCI similar to multiplexing HARQ-ACK in a PUSCH, can indicate whether the UE is capable of transmitting repetitions for a PUCCH with HARQ-ACK information, when the UE does not have dedicated PUCCH resources, in the UL-DL BWP pair used by the UE to transmit a PRACH preamble and receive a PDCCH providing a DCI format scheduling a PDSCH reception, wherein the DCI format can be DCI format 1_0 scheduling PDSCH receptions on more than one serving cells from a set of serving cells, and the PDSCH, wherein the field in the Msg3 PUSCH can be a dedicated field or a field repurposed to indicate whether the UE supports such capability.

For example, a 1-bit indication can be set to "0" to indicate that PUCCH transmission with repetitions is not supported and can be set to "1" to indicate that PUCCH transmission with repetitions is supported. It is possible that the UE is indicated in SIB multiple UL-DL BWP pairs and the UE supports the PUCCH feature in one or more of the indicated UL-DL BWPs. It is also possible that a bitmap in SIB indicates in which of the UL-DL BWP pairs the PUCCH feature can be supported and an indication in Msg3 PUSCH, if present, indicates one or more UL-DL BWP pairs where the UE supports the PUCCH feature.

For example, the UE indicates one of the UL-DL BWP pairs indicated in a SIB where the UE is capable of the PUCCH feature. If a SIB indicates 4 pairs of UL-DL BWPs, a 2-bit signalling in Msg3 PUSCH can be used. Each entry can indicate one of the UL-DL BWP pairs. In case of a MAC CE, absence of the 2-bit field in the Msg3 PUSCH indicates that the UE does not support the PUCCH feature in any of the BWPs indicated in SIB. When a UE is capable of operating with repetitions of a PUCCH transmission in any of the UL-DL BWP pairs indicated in SIB, one entry of the 2-bit signalling can indicate support of the PUCCH feature in all BWPs. A 1-bit signalling can also be used to indicate support of all or none of the BWP pairs. After an indication in Msg3 PUSCH of the UE capability to support a PUCCH transmission with repetitions, the UE can receive an indication to transmit PUCCH with repetitions by a MAC CE in a subsequent PDSCH reception or in a DCI format, wherein the DCI format can be DCI format 1_0 scheduling the subsequent PDSCH reception.

In one example, the indication of a UE capability of transmitting PUCCH with repetitions can be provided in a MAC header by a logical channel ID (LCID) field that can identify a logical channel instance of the corresponding MAC SDU or a type of a corresponding MAC control element (CE). A UE capable of transmitting PUCCH with repetitions can use a CCCH with a specific LCID, for example with an index from 37 to 42, or 47 which are reserved values in 3GPP standard specification TS 38.321 v17.2.0. The association of a LCID index of any of the tables for UL-SCH in 3GPP standard specification TS 38.321 v17.2.0 to a UE supporting the PUCCH feature can be configurable or can be fixed.

In one example, in a single cell, the downlink carrier can be associated with two uplink carriers: one UL carrier, the normal carrier, located in the normal FDD or TDD band, and one supplementary uplink (SUL) carrier, typically located in a lower frequency band. In the cell selection process, the UE acquires the SIB1 which indicates whether the cell is an SUL cell. If the UE supports the SUL operation, the UE selects the uplink carrier to initiate the random access based on DL measurements, and if the UE is capable of operating with repetitions of a PUCCH transmission when the UE is not provided dedicated PUCCH resources, the UE indicates in a field in a Msg3 PUSCH, such as a MAC CE or 1 bit multiplexed as UCI similar to multiplexing HARQ-ACK in a PUSCH, can indicate whether the UE is capable of transmitting repetitions for a PUCCH with HARQ-ACK information, when the UE does not have dedicated PUCCH resources, in the SUL-DL BWP pair used by the UE to transmit a PRACH preamble and receive a PDCCH providing a DCI format scheduling a PDSCH reception, wherein the DCI format can be DCI format 1_0 or DCI format 1_3, and the PDSCH, wherein the field in the Msg3 PUSCH can be a dedicated field or a field repurposed to indicate whether the UE supports such capability.

As described above for single uplink carrier operation, also for two uplink carriers wherein one of the carriers is an SUL carrier, the indication of a UE capability of transmitting PUCCH with repetitions when the UE does not have a dedicated PUCCH resource configuration can be provided in a MAC header by a LCID field that can identify a logical channel instance of the corresponding MAC SDU or a type of a corresponding MAC CE. The UE capable of transmitting PUCCH with repetitions can use a CCCH with a specific LCID or eLCID, for example with an index from 37 to 42, or 47 which are reserved values in 3GPP standard specification TS 38.321 v17.2.0, Table 6.2.1-2 for LCID, or for example with an index from 64 to 292 which are reserved values in 3GPP standard specification TS 38.321 v17.2.0, Table 6.2.1-2b for eLCID. The association of a LCID or eLCID index of any of the tables for UL-SCH in 3GPP standard specification TS 38.321 v17.2.0 to a UE supporting the PUCCH feature can be configurable or can be fixed.

In one example, the UE supports sub-band non-overlapping full duplex (SBFD) operation within a TDD carrier, and the sub-band consists of a set of consecutive RB s within a configured DL and UL BWP pair. If the UE is configured to initiate random access within the UL sub-band of the BWP, and if the UE is capable of operating with repetitions of a PUCCH transmission when the UE is not provided dedicated PUCCH resources, the UE indicates in a field in a Msg3 PUSCH, also transmitted in the UL sub-band, such as a MAC CE or 1 bit multiplexed as UCI similar to multiplexing HARQ-ACK in a PUSCH, whether the UE is capable of transmitting repetitions for a PUCCH with HARQ-ACK information, when the UE does not have dedicated PUCCH resources, in the UL sub-band and DL sub-band(s) used by the UE to transmit a PRACH preamble and receive a PDCCH providing a DCI format scheduling a PDSCH reception, wherein the DCI format can be DCI format 1_0 scheduling PDSCH receptions on more than one serving cells from a set of serving cells, and the PDSCH, wherein the field in the Msg3 PUSCH can be a dedicated field or a field repurposed to indicate whether the UE supports such capability.

As described above for single uplink carrier operation, also for SBFD operation, the indication of a UE capability of transmitting PUCCH with repetitions when the UE does not have a dedicated PUCCH resource configuration can be provided in a MAC header by a LCID or eLCID field that can identify a logical channel instance of the corresponding MAC SDU or a type of a corresponding MAC CE. The UE capable of transmitting PUCCH with repetitions can use a CCCH with a specific LCID or eLCID, for example with an index from 37 to 42, or 47 which are reserved values in 3GPP standard specification TS 38.321 v17.2.0, Table 6.2.1-2 for LCID, or for example with an index from 64 to 292 which are reserved values in 3GPP standard specification TS 38.321 v17.2.0, Table 6.2.1-2b for eLCID. The association of a LCID or eLCID index of any of the tables for UL-SCH in 3GPP standard specification TS 38.321 v17.2.0 to a UE supporting the PUCCH feature can be configurable or can be fixed.

An uplink timing is adjusted in order to align uplink and downlink frames at a gNB. During initial access, a UE transmits random access preamble and the gNB estimates a transmission timing correction for the UE and sends a timing advance (TA) command in a RAR message. Then the UE makes adjustment in the transmit timing. When the UE is in connected mode, the gNB estimates the TA and sends a timing advance command MAC CE to the UE, if a correction is required.

To maintain UL time alignment, a gNB can configure a timeAlignmentTimer parameter per timing advance group (TAG) that controls how long the MAC entity considers the serving cells belonging to the associated TAG to be uplink time aligned. When a timing advance command MAC CE is received, and if an $N_{TA}$, which is a timing advance between downlink and uplink, has been maintained with the indicated TAG, the MAC entity applies the timing advance command for the indicated TAG, and starts or restarts the timeAlignmentTimer associated with the indicated TAG.

When a TA command is received in a RAR message for a serving cell belonging to a TAG or in a MsgB for an SpCell: if the RA preamble was not selected by the MAC entity among the contention-based RA preamble, the MAC entity applies the timing advance command for this TAG and starts or restarts the timeAlignmentTimer associated with this TAG; else if the timeAlignmentTimer associated with this TAG is not running, the MAC identity applies the TA command for this TAG, starts the timeAlignmentTimer associated with this TAG, and when the contention resolution is considered not successful or when the contention resolution is considered successful for SI request, after transmitting HARQ feedback for MAC PDU including UE contention resolution identity MAC CE, the MAC identity stops timeAlignmentTimer associated with this TAG; else the MAC identity ignores the received timing advance command.

When an absolute timing advance command is received in response to a MsgA transmission including C-RNTI MAC CE, the MAC identity applies the timing advance command for the PTAG and starts or restarts the timeAlignmentTimer associated with PTAG.

When a timeAlignmentTimer expires and the timeAlignmentTimer is associated with the PTAG, the MAC identity flushes all HARQ buffers for all serving cells, notifies RRC to release PUCCH for all serving cells, if configured, notifies RRC to release SRS for all serving cells, if configured, clears any configured downlink assignments and configured uplink grants, clears any PUSCH resource for semi-persistent CSI reporting, considers all running timeAlignmentTimers as expired, and maintains $N_{TA}$ of all TAGs. When a timeAlignmentTimer expires and the timeAlignmentTimer is associated with a secondary timing advance group (STAG), for all serving cells belonging to this TAG, the MAC identity flushes all HARQ buffers, notifies RRC to release PUCCH, if configured, notifies RRC to release SRS, if configured, clears any configured downlink assignments and configured uplink grants, clears any PUSCH resource for semi-persistent CSI reporting, and maintains $N_{TA}$ of this TAG.

When a UE receives a timing advance command for a TAG, the UE adjusts uplink timing for PUSCH/SRS/PUCCH transmission on all the serving cells in the TAG based on a value of the timing advance offset $N_{TA,offset}$ that the UE expects to be same for all the serving cells in the TAG and based on the received timing advance command where the uplink timing for PUSCH/SRS/PUCCH transmissions is the same for all the serving cells in the TAG. The UE can be provided the value $N_{TA,offset}$ of the timing advance offset and, if not provided, the UE determines a default value. The timing advance command $T_A$ for a TAG indicates the change of the uplink timing relative to the current uplink timing for the TAG. In case of random access response or in an absolute timing advance command MAC CE, the timing advance command $T_A$ indicates a value $N_{TA}$ that is relative to the SCS of the first uplink transmission from the UE after the reception of the random access response or absolute timing advance command MAC CE.

To achieve uplink time synchronization so that UL and DL frames are aligned at a gNB, in a NTN with transparent satellite payload, a UE needs to compensate for a large and time-varying propagation delay by applying a transmission TA that can include an open loop TA component in addition to a closed loop TA component that is an adjustment TA in response to a TA command as described above for terrestrial networks (TN).

The open loop TA component is typical of an NTN and comprises (i) a cell-specific or common TA that is related to the link between a gNB and a satellite, and (ii) a UE-specific TA that is related to the link between the satellite and the UE. The common TA is controlled by the network.

For the cell-specific or common TA component, the gNB indicates the common TA to the UE, and additionally provides information that allow the UE to update the common TA to compensate for the two-way time-varying propagation delay while avoiding too frequent signaling from the gNB to the UE to provide an updated common TA. To compensate the two-way transmission delay between the uplink time synchronization reference point and the serving satellite, the UE determines $$N_{TA,adj}^{common}$$

based on one-way propagation delay $D_{common}$ (t) that the UE determines based on $TA_{common}$, $TA_{CommonDrift}$, and $TA_{CommonDriftVariant}$ which are respectively provided by ta-Common, ta-CommonDrift, and ta-CommonDriftVariant and on $t_{epoch}$ which is the epoch time of $TA_{common}$, $TA_{CommonDrift}$, and $TA_{CommonDriftVariant}$. $D_{common}$(t) provides a distance at time t between the serving satellite and the uplink time synchronization reference point divided by the speed of light. The uplink time synchronization reference point is the point where DL and UL are frame aligned with an offset given by $N_{TA,offset}$.

For the UE specific component, the UE estimates the UE specific TA, $$N_{TA,adj}^{UE},$$

to compensate for the two-way transmission delay on the link between the serving satellite and the UE (service link) using its own position and the serving satellite position, which are derived, respectively, by its GNSS operation and by higher-layer ephemeris parameters for the serving satellite, if provided.

The closed loop TA component corresponds to the adjustment of the uplink timing for PUSCH/SRS/PUCCH transmission based on the timing advance offset value $N_{TA,offset}$ upon reception of a TA command during RA, wherein the TA command can be received in Msg2 or MsgB for Type-1 or Type-2 RA procedure, respectively, or during connected mode, wherein the TA command is provided in MAC CE.

During initial access common TA and satellite ephemeris can be broadcasted in a SIB, and a UE can determine both the common TA component $$N_{TA,adj}^{common}$$

and the UE specific TA component $$N_{TA,adj}^{UE}$$

of the open loop TA. The UE can transmit Msg1 or MsgA after applying an adjustment for the uplink transmission timing based on the determined open loop TA. The gNB can calculate the closed loop TA and send the closed loop TA to the UE in Msg2 or MsgB for Type-1 or Type-2 RA procedure, respectively. During connected mode the UE can be provided with frequent updates of the TA by MAC CE.

A UE includes a DM-RS in a PUSCH or in a PUCCH transmission in order to enable a receiver at a serving gNB to coherently demodulate modulated data information symbols or control information symbols in the PUSCH or in the PUCCH. The DM-RS is typically located in the earlier symbols of a PUSCH or PUCCH transmission to avoid a demodulation delay due to a processing time for obtaining a channel estimate to be used for the coherent demodulation of data/control symbols under the assumption of phase coherence among the DM-RS and the data/control symbols.

To improve an accuracy of channel estimates multiple DM-RS across repetitions of a PUSCH or PUCCH transmission are filtered, and to enable filtering over multiple DM-RS, a power and phase of the filtered DM-RS needs to remain basically constant in order to maintain power consistency and phase continuity within the DM-RS transmissions, and that also applies to the power and phase of modulated data/control information symbols in order to perform demodulation using the filtered DM-RS. Throughout this disclosure the operation of DM-RS filtering over a number of slots or symbols is also referred as DM-RS bundling, and the time interval over which the UE maintains power consistency and phase continuity of the UL transmission is referred as time domain window (TDW).

When a UE performs an UL time synchronization procedure in NTN by applying an adjustment for the uplink transmission timing based on an open and closed loop TA, an application of the timing adjustment to a PUSCH/ PUCCH/SRS transmission in slot m causes a phase discontinuity for the UL transmission. Similar to the timing adjustment, a frequency adjustment causes a phase discontinuity for the UL transmission. Due to a requirement of phase continuity of the UL transmission during a TDW, the application of timing and/or frequency adjustment can cause the termination of the TDW depending on the phase change being above or below the phase continuity requirement.

For example, if the phase change caused by the application of the timing or frequency adjustment is above a phase offset value that is required to maintain phase continuity, applying the timing or frequency adjustment is considered an event that interrupts the TDW. If the phase change caused by the application of the timing or frequency adjustment is not above the phase offset value that is required to maintain phase continuity, applying the timing or frequency adjustment during the nominal TDW is not considered an event that interrupts the TDW. The UE can have a capability to compensate for phase changes and if the resulting phase change after UE compensation is not above the phase offset value that is required to maintain phase continuity of the UL transmission over the nominal TDW, the nominal TDW is not interrupted. The above also applies when the phase change in the UL transmission is due to other causes than the application of the timing or frequency adjustment.

Thus, there is a need to determine mechanisms for an applicability of DM-RS bundling in NTN considering events that cause a phase change for an UL transmission over a number of slots, a UE capability of compensating for the phase change and a phase offset requirement to maintain phase continuity of the UL transmission over the number of slots.

In the present disclosure, the operation of DM-RS bundling is described for processing modulated data of a PUSCH using channel estimates that the gNB receiver obtains by filtering a number of DM-RS, and equally applies for processing of control information symbols of a PUCCH or SRS symbols.

In the present disclosure, the operation of DM-RS bundling is described for transmission of a PUSCH in a configured UL BWP of an UL carrier, and equally applies for transmission of the PUSCH in a sub-band of a configured DL or UL BWP, wherein the sub-band is configured or indicated for UL, or for transmission of the PUSCH in multiple UL BWPs in one or more UL carriers of a serving cell.

An operation of DM-RS bundling over a number of slots can be for processing PUSCH repetitions of a same TB in each repetition, or PUSCH transmissions of different TBs, or also PUSCH transmission of a single TB over multiple slots, or a combination of the above. For a PUCCH transmission with repetitions, a same control information can be provided in each repetition, or different control information can be provided in some repetitions, or same control information can be encoded and mapped to resource elements over multiple repetitions. It is possible that a slot includes one or more repetitions, and consecutive repetitions in a same slot or in different slots can be separated by one or more symbols, with the one or more symbols used for other uplink transmission(s) or downlink reception(s), or by zero symbols.

In the present disclosure, a PUSCH transmission with repetitions can be dynamically scheduled by an UL grant in a DCI, or the transmission can correspond to a configured grant Type 1 PUSCH transmission, wherein the configured grant Type 1 PUSCH transmission can be semi-statically configured to operate upon the reception of higher layer parameter of configuredGrantConfig including rrc-Config-uredUplinkGrant without the detection of an UL grant in a DCI, or the transmission can correspond to a configured grant Type 2 PUSCH transmission, wherein the configured grant Type 2 PUSCH transmission can be semi-persistently scheduled by an UL grant in a valid activation DCI after the reception of higher layer parameter configuredGrantConfig not including rrc-ConfiguredUplinkGrant.

A PUCCH transmission with repetitions can be dynamically scheduled or semi-statically configured by higher layers. It is possible that the PUSCH transmission is scheduled by a RAR UL grant in an active UL BWP indicated by higher layers. It is also possible that for a Type-2 random access procedure, the PUSCH transmission is transmitted after transmitting a PRACH in a PUSCH transmission occasion that is associated with a DM-RS resource mapped to a preamble of valid PRACH occasions.

In the present disclosure a time domain window (TDW) can be a nominal TDW with a length L determined by the UE based on a configuration and/or a UE capability, or configured by a higher layer parameter, or can be an actual TDW with a length determined by L and by a dynamic signaling in a DCI format or by MAC CE, or by a semi-static signaling provided in a higher layer configuration, or by a combination of dynamic and semi-static signaling. It is possible that the length of the TDW is determined based on the UE capability of maintaining phase continuity of the transmitted signal over a period of time with a phase difference between transmissions in consecutive slots below a certain maximum value. The maximum value can be a fixed value or can be a configured or indicated value by a gNB. A nominal TDW can consist of one or multiple actual TDWs within which the UE is expected to maintain power consistency and phase continuity across PUSCH transmissions of PUSCH repetition, or across a TB when transmitted over multiple slots, or across PUCCH transmissions of PUCCH repetition.

A common TA and satellite ephemeris, provided to a UE to compensate for a delay in the link between gNB and satellite and a delay in the link between UE and satellite, respectively, are associated with a validity duration, which indicates the maximum time interval after which the UE needs to reacquire a new common TA and new satellite ephemeris. The validity duration is usually much larger than the periodicity of SS/PBCH blocks, and the UE may receive new common TA and satellite ephemeris in the SIB broadcasted with the SS/PBCH periodicity or a larger periodicity before the validity duration expires. For the UL time synchronization procedure the UE may apply a new adjustment at a time instant derived from the time when the new common TA and/or satellite ephemeris are provided, in order to achieve a better UL synchronization by using the most updated information from the gNB and from the satellite ephemeris, or derived from the time when the validity duration expires. During a DM-RS bundling, the UE cannot apply a time adjustment for synchronization. If the time adjustment for synchronization is applied, the DM-RS bundling window needs to be terminated.

Figure 12:
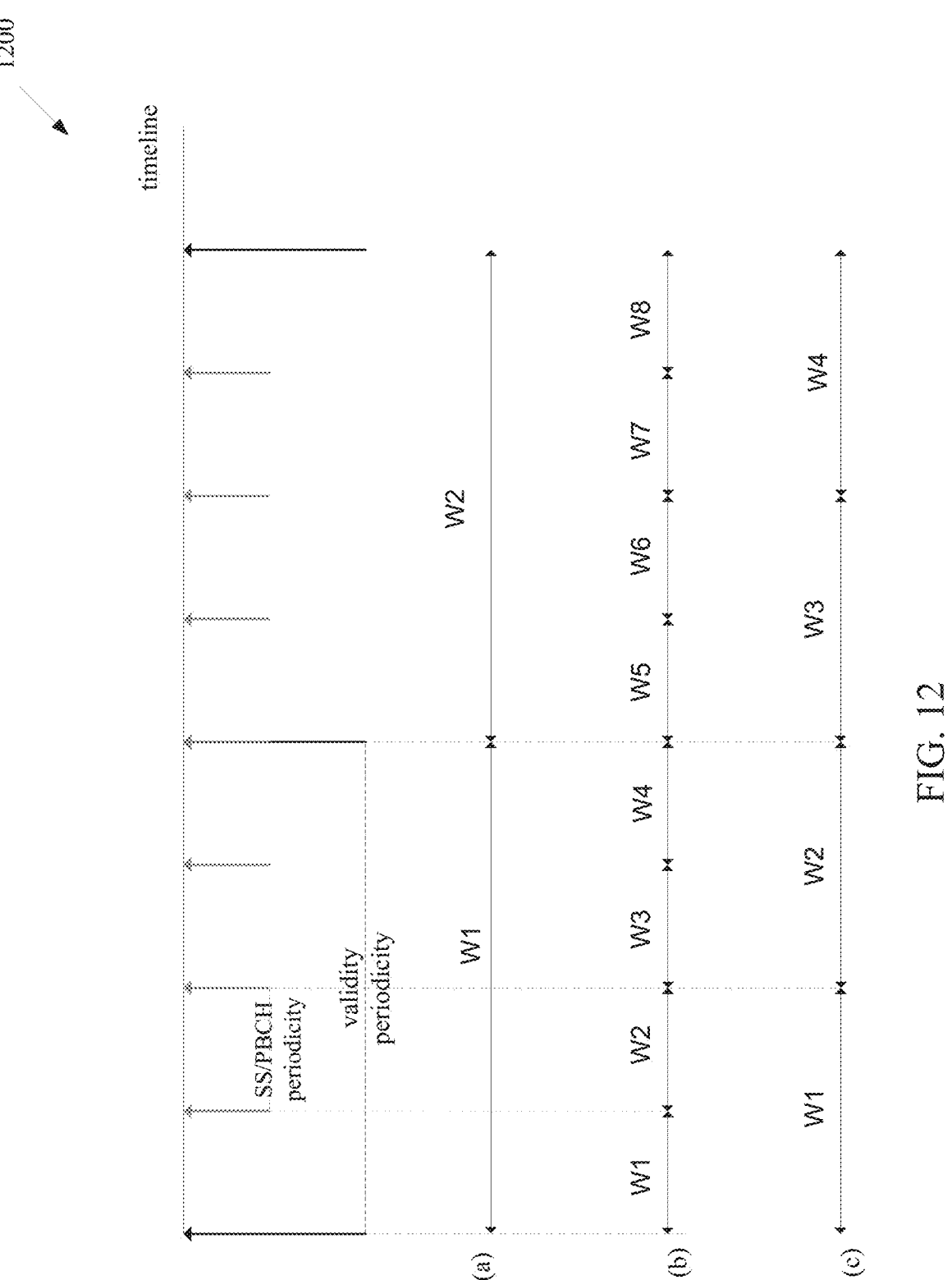
FIG. 12 illustrates an example of DM-RS bundling with parameters according to embodiments of the present disclosure.

FIG. 12 illustrates an example of DM-RS bundling with parameters 1200 according to embodiments of the present disclosure. An embodiment of the parameters with periodicity 1200 shown in FIG. 12 is for illustration only.

FIG. 12 illustrates examples of applying DM-RS bundling based on the validity duration of common TA parameter and/or satellite ephemeris, on the timing when the UE receives updates of open-loop parameters in SIB, and on when the UE updates the open loop related parameters.

In one example (e.g., (a) of FIG. 12), the UE updates the open-loop parameters with a same periodicity as the validity duration periodicity. Thus, the TDW has length equal to the validity duration.

In one example (e.g., (b) of FIG. 12), the UE updates the open-loop parameters with a same periodicity as the UE receives open loop parameters in SIB. Thus, the TDW has length equal to the SS/PBCH periodicity. In this example the periodicity with which the UE reads the SIB is same as the SS/PBCH periodicity.

In one example (e.g., (c) of FIG. 12), the UE updates the open-loop parameters with a second periodicity that is a multiple of a first periodicity associated with the UE receiving open loop parameters in SIB. Thus, the TDW has length equal to the second periodicity.

FIGS. 13 and 14 illustrate flowcharts of UE procedure 1300 and 1400 for DM-RS bundling according to embodiments of the present disclosure. The UE procedures 1300 and 1400 as may be performed by a UE (e.g., 111-116 as illustrated in FIG. 1). Embodiments of the UE procedures 1300 and 1400 shown in FIGS. 13 and 14 are for illustration only. One or more of the components illustrated in FIGS. 13 and 14 can be implemented in specialized circuitry configured to perform the noted functions or one or more of the components can be implemented by one or more processors executing instructions to perform the noted functions.

FIG. 13 illustrates an example procedure for a UE to apply time and frequency adjustment before the start of a DM-RS window according to the present disclosure.

As illustrated in FIG. 13, a UE is configured for operation with DM-RS bundling, and is configured/indicated to transmit a PUSCH with repetitions in step 1310. The UE applies time adjustment and frequency adjustment prior to a transmission of a first repetition in a DM-RS bundling window in step 1320. The UE transmits repetitions after the first repetitions within the DM-RS bundling window without applying a new time or frequency adjustment in step 1330.

In one example, for an UL time synchronization procedure, a UE applies a time adjustment before the start of a DM-RS bundling to compensate for the open loop component of a TA.

FIG. 14 illustrates an example procedure for a UE to apply a time adjustment before the start of a DM-RS window according to the present disclosure.

As illustrated in FIG. 14, a UE is configured for operation with DM-RS bundling, and is configured/indicated to transmit a PUSCH with repetitions in step 1410. The UE applies a time adjustment for an open loop TA component prior to a transmission of a first repetition in a first DM-RS bundling window in step 1420. The UE transmits repetitions after the first repetitions within the first DM-RS bundling window without applying a new time adjustment in step 1430. The UE applies a new time adjustment when the window changes in step 1440.

In one example, for the UL time synchronization procedure, a UE applies a time adjustment at a time derived from the time when the validity duration of the common TA and UE-specific TA parameters expires. When DM-RS bundling is enabled, the UE applies such adjustment before the start of the DM-RS window. During the TDW the UE is not expected to apply a new time adjustment, independently on whether the UE acquires updated open loop parameters from a SIB. The maximum TDW length can be same as the validity duration.

When a gNB configures a UE for operation with DM-RS bundling, the gNB can indicate a length L of the TDW by a higher layer parameter, or by a DCI format that indicates the TDW length or indicates one of the values configured by a higher layer parameter. For example, the UE can be configured with two or four values for the TDW length and a 1-bit or 2-bit indication in the DCI format indicates one of the two or four values. Different values of the TDW length can be associated with operation in terrestrial or non-terrestrial networks, and/or subject to a UE capability of performing phase compensation during a time period. It is possible that the UE is configured with one value L1 associated to an operation in terrestrial mode and with another value L2 associated to the operation in non-terrestrial mode, and depending on whether the UE is configured to operate in terrestrial or non-terrestrial mode, the length of the TDW is set to L1 or L2.

When the UE is configured with DM-RS bundling, the UE capability can be associated to one or more of the following: (1) whether the UE has the capability of performing phase compensation during a TDW; (2) the UE is capable of performing phase compensation over a maximum number of slots or over a maximum time period; (3) the UE is capable of performing phase compensation up to a maximum phase offset value; (4) the UE is capable of performing phase compensation up to a phase offset value that is associated to a number of slots or to a time period; or (5) the UE is capable of performing phase compensation after a number of slots or after a time period from a previous phase compensation.

When the UE is configured with a length L of the TDW, and the UE is capable of performing phase compensation over a maximum number of slots or maximum time period T: (1) if L is smaller or equal to T, the length of the nominal TDW is L; and (2) if L is larger than T, (i) the length of the nominal TDW is T, or (ii) the length of the nominal TDW is L and the UE does not perform phase compensation after the maximum number of slots or maximum time period T.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
  receive a system information block (SIB) providing information for:
    a first set of physical uplink control channel (PUCCH) resources for a transmission of a PUCCH on a primary cell, and
    a set of numbers for repetitions of the transmission of the PUCCH on the primary cell, and
  receive a physical downlink control channel (PDCCH) providing a downlink control information (DCI) format that schedules a reception of a first physical downlink shared channel (PDSCH), wherein:
    the DCI format includes a downlink assignment index (DAI) field,
    the DCI format includes a PUCCH resource indicator field,
    first acknowledgement information corresponding to the reception of the first PDSCH is provided by the PUCCH,
    a value of the DAI field indicates a number of receptions of PDSCHs with corresponding acknowledgement information provided by the PUCCH when the UE is provided a second set of PUCCH resources by UE-specific higher layer signaling, and
    the value of the DAI field indicates a number of repetitions, from the set of numbers for repetitions, for the transmission of the PUCCH when the UE is not provided the second set of PUCCH resources by UE-specific higher layer signaling; and
a processor operably coupled to the transceiver, the processor configured to:
  determine a PUCCH resource from the first set of PUCCH resources based on the PUCCH resource indicator field, and
  determine the number of repetitions, from the set of numbers of repetitions, based on the DAI field,
wherein the UE is not provided the second set of PUCCH resources by UE-specific higher layer signaling,
wherein the transceiver is further configured to transmit the PUCCH with the number of repetitions using the PUCCH resource on the primary cell,
wherein the SIB further provides information for a first reference signal received power (RSRP) value and information for a second RSRP value, and
wherein the processor is further configured to:
  determine a RSRP value,
  determine that the RSRP value is smaller than or equal to the first RSRP value,
  determine the number of repetitions based on the RSRP value being smaller than or equal to the first RSRP value, and
  determine a second number of repetitions for transmission of a physical uplink shared channel (PUSCH) in a random access procedure based on the RSRP value being smaller than or equal to the second RSRP value.

2. The UE of claim 1, wherein:
the set of numbers of repetitions for the PUCCH transmission is a single number,
the single number is larger than one, and
the DAI field indicates one of:
  no repetitions, or
  the single number.

3. The UE of claim 1, wherein the processor is further configured to determine the number of repetitions based on the DAI value based on identifying that the set of numbers of repetitions includes more than one number.

4. The UE of claim 1, wherein the set of numbers of repetitions includes a value of one corresponding to no repetitions.

5. The UE of claim 1, wherein the transceiver is further configured to transmit a medium access control (MAC) control element (CE) including a reserved logical channel identifier to indicate a capability to transmit the PUCCH with repetitions.

6. A base station (BS) comprising:
a transceiver configured to:
  transmit a system information block (SIB) providing information for:
    a first set of physical uplink control channel (PUCCH) resources for a reception of a PUCCH on a primary cell, and
    a set of numbers for repetitions of the reception of the PUCCH on the primary cell, and
  transmit a physical downlink control channel (PDCCH) providing a downlink control information (DCI) format that schedules a transmission of a first physical downlink shared channel (PDSCH), wherein:
    the DCI format includes a downlink assignment index (DAI) field,
    the DCI format includes a PUCCH resource indicator field, first acknowledgement information corresponding to the transmission of the first PDSCH is provided by the PUCCH, a value of the DAI field indicates a number of transmissions of PDSCHs with corresponding acknowledgement information provided by the PUCCH when a user equipment (UE) is provided a second set of PUCCH resources by UE-specific higher layer signaling, and the value of the DAI field indicates a number of repetitions, from the set of numbers of repetitions, for the reception of the PUCCH when the UE is not provided the second set of PUCCH resources by UE-specific higher layer signaling; and a processor operably coupled to the transceiver, the processor configured to:

determine a PUCCH resource from the first set of PUCCH resources based on the PUCCH resource indicator field, and determine the number of repetitions, from the set of numbers of repetitions, based on the DAI field, wherein the UE is not provided the second set of PUCCH resources by UE-specific higher layer signaling, wherein the transceiver is further configured to receive the PUCCH with the number of repetitions using the PUCCH resource on the primary cell, wherein the SIB further provides information for a first reference signal received power (RSRP) value and information for a second RSRP value, and wherein the processor is further configured to:

determine a RSRP value, determine that the RSRP value is smaller than or equal to the first RSRP value, determine the number of repetitions based on the RSRP value being smaller than or equal to the first RSRP value, and determine a second number of repetitions for reception of a physical uplink shared channel (PUSCH) in a random access procedure based on the RSRP value being smaller than or equal to the second RSRP value.

7. The BS of claim 6, wherein:

the set of numbers of repetitions for the PUCCH reception is a single number, the single number is larger than one, and the DAI field indicates one of:

no repetitions, or the single number.

8. The BS of claim 6, wherein the processor is further configured to determine the number of repetitions based on the DAI value based on identifying that the set of numbers of repetitions includes more than one number.

9. The BS of claim 6, wherein the transceiver is further configured to receive a medium access control (MAC) control element (CE) including a reserved logical channel identifier indicating a capability of the UE to transmit the PUCCH with repetitions.

10. A method performed by a user equipment (UE), the method comprising:

receiving a system information block (SIB) providing information for:

a first set of physical uplink control channel (PUCCH) resources for a transmission of a PUCCH on a primary cell, and a set of numbers for repetitions of the transmission of the PUCCH on the primary cell;

receiving a physical downlink control channel (PDCCH) providing a downlink control information (DCI) format that schedules a reception of a first physical downlink shared channel (PDSCH), wherein:

the DCI format includes a downlink assignment index (DAI) field, the DCI format includes a PUCCH resource indicator field, first acknowledgement information corresponding to the reception of the first PDSCH is provided by the PUCCH, a value of the DAI field indicates a number of receptions of PDSCHs with corresponding acknowledgement information provided by the PUCCH when the UE is provided a second set of PUCCH resources by UE-specific higher layer signaling, and the value of the DAI field indicates a number of repetitions, from the set of numbers for repetitions, for the transmission of the PUCCH when the UE is not provided the second set of PUCCH resources by UE-specific higher layer signaling;

determining a PUCCH resource from the first set of PUCCH resources based on the PUCCH resource indicator field;

determining the number of repetitions, from the set of numbers of repetitions, based on the DAI field, wherein the UE is not provided the second set of PUCCH resources by UE-specific higher layer signaling;

transmitting the PUCCH with the number of repetitions using the PUCCH resource on the primary cell, wherein the SIB further provides information for a first reference signal received power (RSRP) value and information for a second RSRP value;

determining a RSRP value;

determining that the RSRP value is smaller than or equal to the first RSRP value;

determining the number of repetitions based on the RSRP value being smaller than or equal to the first RSRP value; and determining a second number of repetitions for transmission of a physical uplink shared channel (PUSCH) in a random access procedure based on the RSRP value being smaller than or equal to the second RSRP value.

11. The method of claim 10, wherein:

the set of numbers of repetitions for the PUCCH transmission is a single number, the single number is larger than one, and the DAI field indicates one of:

no repetitions, or the single number.

12. The method of claim 10, wherein determining the number of repetitions based on the DAI value further comprises determining the number of repetitions based on the DAI value based on identifying that the set of numbers of repetitions includes more than one number.

13. The method of claim 10, wherein the set of numbers of repetitions includes a value of one corresponding to no repetitions.

14. The method of claim 10, further comprising:

transmitting a medium access control (MAC) control element (CE) including a reserved logical channel identifier to indicate a capability to transmit the PUCCH with repetitions.

* * * * *